US010839510B2

(12) United States Patent
Mahoor et al.

(10) Patent No.: US 10,839,510 B2
(45) Date of Patent: Nov. 17, 2020

(54) METHODS AND SYSTEMS FOR HUMAN TISSUE ANALYSIS USING SHEARLET TRANSFORMS

(71) Applicant: Colorado Seminary, Owner and Operator of University of Denver, Denver, CO (US)

(72) Inventors: Mohammad H. Mahoor, Lone Tree, CO (US); Hadi Rezaeilouyeh, Littleton, CO (US); Ali Mollahosseini, Denver, CO (US)

(73) Assignee: Colorado Seminary, which owns and operates the University of Denver, Denver, CO (US)

( * ) Notice: Subject to any disclaimer, the term of this patent is extended or adjusted under 35 U.S.C. 154(b) by 0 days.

(21) Appl. No.: 15/239,659

(22) Filed: Aug. 17, 2016

(65) Prior Publication Data

US 2017/0053398 A1    Feb. 23, 2017

Related U.S. Application Data

(60) Provisional application No. 62/207,201, filed on Aug. 19, 2015.

(51) Int. Cl.
*G06T 7/00* (2017.01)
*G06K 9/62* (2006.01)
(Continued)

(52) U.S. Cl.
CPC .......... *G06T 7/0012* (2013.01); *G06K 9/4604* (2013.01); *G06K 9/6269* (2013.01);
(Continued)

(58) Field of Classification Search
CPC ............... G06T 7/0012; G06T 7/42; G06T 2207/10024; G06T 2207/20048;
(Continued)

(56) References Cited

U.S. PATENT DOCUMENTS

| 8,077,958 B2 * | 12/2011 | Qian ............... G06T 7/0012 382/100 |
| 2009/0161928 A1 * | 6/2009 | Khamene ............ G06T 7/0012 382/128 |
| 2016/0253466 A1 * | 9/2016 | Agaian ................ G06N 3/0427 382/128 |

OTHER PUBLICATIONS

American Cancer Society, *Cancer facts and figures*, Tech. Rep (2016), 72 pages.
(Continued)

*Primary Examiner* — Jon Chang
(74) *Attorney, Agent, or Firm* — Maschoff Brennan

(57) ABSTRACT

Various arrangements for identifying and grading cancer in tissue samples are presented. A digital image of a stained tissue sample may be acquired. A Shearlet transform may be performed on the digital image of the stained tissue sample. Shearlet coefficients may be calculated based on the performed Shearlet transform of the normalized digital RGB image of the stained tissue sample. A trained neural network may be applied to create a plurality of feature maps using the digital image and Shearlet coefficients, wherein the trained neural network was trained using a plurality of images and Shearlet coefficients of a plurality of digital images. A classifier may be applied to an output of the trained neural network to identify whether cancer is present in the stained tissue sample. A notification may be output that is indicative of a grade of detected cancer in the sample.

20 Claims, 16 Drawing Sheets
(5 of 16 Drawing Sheet(s) Filed in Color)

(51) Int. Cl.
  G06K 9/46    (2006.01)
  G06T 7/42    (2017.01)
  G06K 9/52    (2006.01)
(52) U.S. Cl.
  CPC ............... *G06T 7/42* (2017.01); *G06K 9/527*
    (2013.01); *G06T 2207/10024* (2013.01); *G06T*
     *2207/20048* (2013.01); *G06T 2207/20064*
    (2013.01); *G06T 2207/30024* (2013.01); *G06T*
     *2207/30068* (2013.01); *G06T 2207/30081*
     (2013.01); *G06T 2207/30096* (2013.01)
(58) Field of Classification Search
  CPC . G06T 2207/20064; G06T 2207/30024; G06T
     2207/30068; G06T 2207/30081; G06T
      2207/30096; G06K 9/4604; G06K
      9/6269; G06K 9/4628; G06K 9/527
  See application file for complete search history.

(56) References Cited

OTHER PUBLICATIONS

D. F. Gleason, "Histologic grading of prostate cancer: a perspective." *Human pathology* 23, No. 3, 273-279 (1992).
C. Demir, and B. Yener, "Automated cancer diagnosis based on histopathological images: a systematic survey." *Rensselaer Polytechnic Institute, Tech. Rep* (2005), 16 pages.
L. E. Boucheron, B. S. Manjunath, and N. R. Harvey, "Use of imperfectly segmented nuclei in the classification of histopathology images of breast cancer." In *2010 IEEE International Conference on Acoustics, Speech and Signal Processing*, pp. 666-669. IEEE (2010).
R. Farjam, H. Soltanian-Zadeh, A. Zoroofi, and k. Jafari-Khouzani, "Tree-structured grading of pathological images of prostate." In *Medical Imaging*, pp. 840-851. International Society for Optics and Photonics (2005).
R. Stotzka, R. Männer, P. H. Bartels, and D. Thompson, "Neural Classifier Systems for Histopathologic Diagnosis." *Analytical and quantitative cytology and histology*. pp. 1-29 (1995).
MATLAB Release 2015b, MathWorks, Inc., Natick, Massachusetts, United States, Retrieved from https://www.mathworks.com/products/mathlab/, Accessed on Sep. 28, 2016, 8 pages.
K. Jafari-Khouzani, and H. Soltanian-Zadeh, "Multiwavelet grading of pathological images of prostate." *IEEE Transactions on Biomedical Engineering* 50, No. 6 697-704 (2003).
A. Tabesh, M. Teverovskiy, H.Y. Pang, V. P. Kumar, D. Verbel, A. Kotsianti, and O. Saidi, "Multifeature prostate cancer diagnosis and Gleason grading of histological images." *IEEE transactions on medical imaging* 26, No. 10 1366-1378 (2007).
H. Rezaeilouyeh, M. H. Mahoor, S. M. Mavadati, and J. J. Zhang, "A microscopic image classification method using Shearlet transform." In *Healthcare Informatics (ICHI), 2013 IEEE International Conference on*, pp. 382-386 (2013).
H. Rezaeilouyeh, M. H. Mahoor, F. G. La Rosa, and J. J. Zhang, "Prostate cancer detection and Gleason grading of histological images using Shearlet transform." In *2013 Asilomar Conference on Signals, Systems and Computers*, pp. 268-272 (2013).
H. Rezaeilouyeh, M. H. Mahoor, J. J. Zhang, F. G. La Rosa, S. Chang, and P. N. Werahera, "Diagnosis of prostatic carcinoma on multiparametric magnetic resonance imaging using Shearlet transform." In *2014 36th Annual International Conference of the IEEE Engineering in Medicine and Biology Society*, pp. 6442-6445 (2014).
A. Cruz-Roa, A. Basavanhally, F. González, H. Gilmore, M. Feldman, S. Ganesan, N. Shih, J. Tomaszewski, and A. Madabhushi, "Automatic detection of invasive ductal carcinoma in whole slide images with convolutional neural networks." In *SPIE medical imaging*, pp. 904103-904103, International Society for Optics and Photonics (2014).
Y. Bengio, "Learning deep architectures for AI." *Foundations and trends® in Machine Learning* 2, No. 1 1-127 (2009).

Y. Bengio, A. Courville, and P. Vincent, "Representation learning: A review and new perspectives." *IEEE transactions on pattern analysis and machine intelligence* 35, No. 8 1798-1828 (2013).
S. Liao, Y. Gao, A. Oto, and D. Shen, "Representation learning: a unified deep learning framework for automatic prostate MR segmentation." In *International Conference on Medical Image Computing and Computer-Assisted Intervention*, pp. 254-261. Springer Berlin Heidelberg (2013).
H. D. Couture, J. S. Marron, N. E. Thomas, C. M. Perou, and M. Niethammer, "Hierarchical task-driven feature learning for tumor histology." In *2015 IEEE 12th International Symposium on Biomedical Imaging (ISBI)*, pp. 999-1003 (2015).
D. C. Cireşan, A. Giusti, L. M. Gambardella, and J. Schmidhuber, "Mitosis detection in breast cancer histology images with deep neural networks." In *International Conference on Medical Image Computing and Computer-assisted Intervention*, pp. 411-418. Springer Berlin Heidelberg (2013).
Y. Li, L. M. Po, X. Xu, L. Feng, F. Yuan, C. H. Cheung, and K. W. Cheung, "No-reference image quality assessment with Shearlet transform and deep neural networks." *Neurocomputing* 154 94-109 (2015).
G. Easley, Demetrio Labate, and Wang-Q. Lim, "Sparse directional image representations using the discrete shearlet transform." *Applied and Computational Harmonic Analysis* 25, No. 1 25-46 (2008).
S. Häuser, and G. Steidl, "Fast finite shearlet transform." *arXiv preprint arXiv:1202.1773* (2014).
E. Candes, L. Demanet, D. Donoho, and L. Ying, "Fast discrete curvelet transforms." *Multiscale Modeling & Simulation* 5, No. 3 861-899 (2006).
P. Grohs, S. Keiper, G. Kutyniok, and M. Schäfer, "Parabolic molecules: Curvelets, shearlets, and beyond." In *Approximation Theory XIV: San Antonio 2013*, pp. 141-172. Springer International Publishing (2014).
G. R. Easley, D. Labate, and W .Q. Lim, "Optimally sparse image representations using shearlets." In *2006 Fortieth Asilomar Conference on Signals, Systems and Computers*, pp. 974-978. IEEE (2006).
G. R. Easley, D. Labate, and F. Colonna, "Shearlet-based total variation diffusion for denoising." *IEEE Transactions on Image processing* 18, No. 2 260-268 (2009).
A. V. Oppenheim, and J. S. Lim, "The importance of phase in signals." *Proceedings of the IEEE* 69, No. 5 529-541 (1981).
N. Skarbnik, Y.Y. Zeevi, and C. Sagiv, "*The Importance of phase in image processing.*" Tech. Report, pp. 1-30 (2010).
P. Kovesi, "Phase congruency detects corners and edges." In *The Australian pattern recognition society conference: DICTA* (2003).
Y. LeCun, Y. Bengio, and G. Hinton, "Deep learning." *Nature*521, No. 7553 436-444 (2015).
Y. LeCun, L. Bottou, Y. Bengio, and P. Haffner, "Gradient-based learning applied to document recognition." *Proceedings of the IEEE*86, No. 11 2278-2324 (1998).
I. Arel, D. C. Rose, and T. P. Karnowski, "Deep machine learning—a new frontier in artificial intelligence research [research frontier]."*IEEE Computational Intelligence Magazine* 5, No. 4 13-18 (2010).
J. Schmidhuber, "Deep learning in neural networks: An overview."*Neural Networks* 61 85-117 (2015).
G. E. Hinton, N. Srivastava, A. Krizhevsky, I. Sutskever, and R. R. Salakhutdinov, "Improving neural networks by preventing co-adaptation of feature detectors." *arXiv preprint arXiv: 1207.0580* (2012).
E. D. Gelasca, J. Byun, B. Obara, and B. S. Manjunath, "Evaluation and benchmark for biological image segmentation," IEEE International Conference on Image Processing. San Diego, CA, USA: IEEE Signal Processing Society, pp. 1816-1819 (2008).
A. Laine, and J. Fan, "Texture classification by wavelet packet signatures." *IEEE Transactions on pattern analysis and machine intelligence*15, No. 11 1186-1191 (1993).
R. M. Haralick, and K. Shanmugam, "Textural features for image classification." *IEEE Transactions on systems, man, and cybernetics*6 610-621 (1973).

\* cited by examiner

METHODS AND SYSTEMS FOR HUMAN TISSUE ANALYSIS USING SHEARLET TRANSFORMS

CROSS REFERENCE TO RELATED APPLICATION

This Application claims priority to U.S. Provisional Patent Application 62/207,201, filed on Aug. 19, 2015, entitled "Classification of a Tissue Using Combined Feature Extraction Operations," the entire disclosure of which is hereby incorporated by reference for all purposes.

GOVERNMENT LICENSE RIGHTS

This invention was made with government support through grant IIP-1230556 awarded by the National Science Foundation. The government has certain rights in the invention.

BACKGROUND

Proper treatments of many types of cancer are based on determinations of the stage of the cancer and the extent of its spread. These determinations often are based on analyses of samples of possibly cancerous tissues. Such analyses can be used to determine stages or grades of the cancer.

As an example of cancer, prostate cancer is the most frequently diagnosed cancer in men aside from skin cancer. It is estimated that 238,590 new cases of prostate cancer occurred in the US during 2013 and over 1.6 million new cases of cancer will occur in the US in 2016. Prostate cancer cells can spread by breaking away from a prostate tumor. They may attach to other tissues and grow to form new tumors that may damage those tissues. Therefore it is vital to diagnose prostate cancer in early stages and provide necessary treatment. Other types of cancer can be just as dangerous, such as breast cancer.

SUMMARY

Various arrangements, including systems, devices, and methods for identifying and grading cancer in tissue samples are presented. A digital RGB image of a stained tissue sample may be acquired, the stained tissue sample to be analyzed on a multiple level scale for cancer, wherein the stained tissue sample is of a type of tissue. The digital RGB image of a stained tissue sample may be normalized to correct for medical tissue scanning and staining variations. A Shearlet transform may be performed on the normalized digital RGB image of the stained tissue sample. Shearlet coefficients may be calculated based on the performed Shearlet transform of the normalized digital RGB image of the stained tissue sample. A trained neural network may be applied to create a plurality of feature maps using the Shearlet coefficients, wherein the trained neural network was trained using Shearlet coefficients of a plurality of digital RGB images, the plurality of digital RGB images comprising a first subset of digital RGB images that are indicative of tissue of the type of tissue having varying grades of cancer and a second subset of digital RGB images that are indicative of non-cancerous tissue. A classifier may be applied to an output of the trained neural network to identify whether cancer is present in the stained tissue sample. A notification may be output that is indicative of whether cancer is present in the stained tissue sample based on applying the classifier to the output of the trained neural network.

One or more of the following features may be incorporated as part of the various embodiments: Applying the classifier to the output of the trained neural network may select a cancer grade from a multiple grade scale and the notification output is further indicative of the cancer grade. The Shearlet coefficients may be calculated for magnitude and phase. The Shearlet coefficients for magnitude and phase may be each calculated for multiple decomposition levels. The Shearlet coefficients for magnitude and phase may each be calculated for five decomposition levels. The multiple grade scale may be the Gleason grading scale. The type of tissue may be prostrate tissue or breast tissue. The stained tissue sample may be scanned using the medical tissue scanner to obtain the digital RGB image of the stained tissue sample. The plurality of digital RGB images of stained tissue samples of the type of tissue may be acquired. Learning classifications for the plurality of digital RGB images of the stained tissue samples of the type of tissue may also be acquired. The plurality of digital RGB images of stained tissue samples may be normalized to correct for medical tissue scanning and staining variations. Shearlet transforms may be performed on the plurality of normalized digital RGB images of the stained tissue samples. Shearlet coefficients may be calculated for each of the performed Shearlet transforms of the plurality of normalized digital RGB image of the stained tissue samples. A neural network may be created for classifying tissue samples to be analyzed, the neural network created based on the calculated Shearlet coefficients for each of the performed Shearlet transforms of the plurality of normalized digital RGB images of the stained tissue samples and the received learning classifications.

Certain embodiments are for a computer-implemented method of determining a grade of a tissue sample based on a digital image of the tissue sample. A digital image of the tissue sample is received by the computer system. The computer system performs a feature extraction operation using the digital image of the tissue sample. The feature extraction operation comprises: calculating discrete Shearlet transform coefficients of the digital image of the tissue sample; calculating a co-occurrence matrix of the discrete Shearlet transform coefficients; and obtaining a plurality of statistical data values using the co-occurrence matrix. The method determines a value of a grade for the tissue sample from the statistical data values.

Embodiments of the methods and systems may include using at least one additional feature extraction operation. Such additional feature extraction operations may include: morphological feature extraction of the digital image of the tissue sample using image segmentation; and feature extraction using intensity values of pixels. Morphological feature extraction may include any combination of the following: applying a mean shift cluster algorithm to the digital image of the tissue sample to obtain an initial segmented image, converting the initial segmented image to a Hue, Saturation and Value (HSV) color space segmented image; applying a threshold to the HSV color space segmented image to generate a mask image; and calculating the quantity of cell nuclei using the mask image.

Feature extraction using intensity values of pixels may include: generating from the digital image of the tissue sample a plurality of images that have distinct color spaces; calculating color channel histograms for each of the plurality of images that have distinct color spaces; and relating the color channel histograms with the grade of tissue sample. In additional and/or alternative embodiments, feature extraction using intensity values of pixels may include: generating a grey scale image of the digital image; determining a co-occurrence matrix of the grey scale image; and determining statistical values from the co-occurrence matrix of the grey scale image.

Embodiments of the methods may include combining of the results of a plurality of feature extraction operations. One method for combining the results uses a Multiple Kernel Learning (MKL). The MKL algorithm may use a Support Vector Machines (SVM) model. The MKL algorithm may use a Gaussian kernel and a polynomial kernel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The embodiments disclosed herein are directed to methods and systems for evaluating tissue samples for a status of a cancer. While examples within this document refer to prostate and breast cancer, it should be understood that the methods, systems, and techniques detailed herein can be applicable to various other forms of cancer that may occur in human or non-human tissue. Particular embodiments are directed to determining a Gleason grade of a prostate tissue sample by analyzing a digital image of the tissue sample. Breast cancer tissue samples can be evaluated using different grades referred to as a Nottingham Histologic Score or "Elston Grade." Such histological grading can be important in determining whether and how a patient from whom the tissue sample was collected is to be treated. Histological grading can be important in cancer prognosis and can be used for treatment planning. Cancer aggressiveness can be quantified using histological grading. Embodiments detailed herein are adaptable to process digital images of stained tissue samples of various types of tissue to be evaluated for the presence of cancer and the grade of cancer, such as according to any of the preceding grades. Embodiments detailed herein can be trained to evaluate test tissue samples according to these grading scales or other grading scales, possibly including histological grades yet to be determined due to the learning capabilities of embodiments detailed herein.

For prostate cancer, the Gleason grading system is the most common method for histological grading of prostate tissue samples. In the Gleason grading system, the prostate cancer may be classified as grade 1 through 5. The grade increases with increasing malignancy level or lack of glands differentiation. The heterogeneity of prostate cancer is described by the Gleason score. The Gleason score represents the sum of the most and second most predominant Gleason grades present in the tissue section. Those are the largest size of tumor presented in the prostate tissue. Combined Gleason scores for the two samples range from 2 to 10. Patients with a combined score between 2 and 4 are unlikely to develop aggressive disease, whereas most patients with a score of 8-10 die of prostatic carcinoma.

Figure 1:
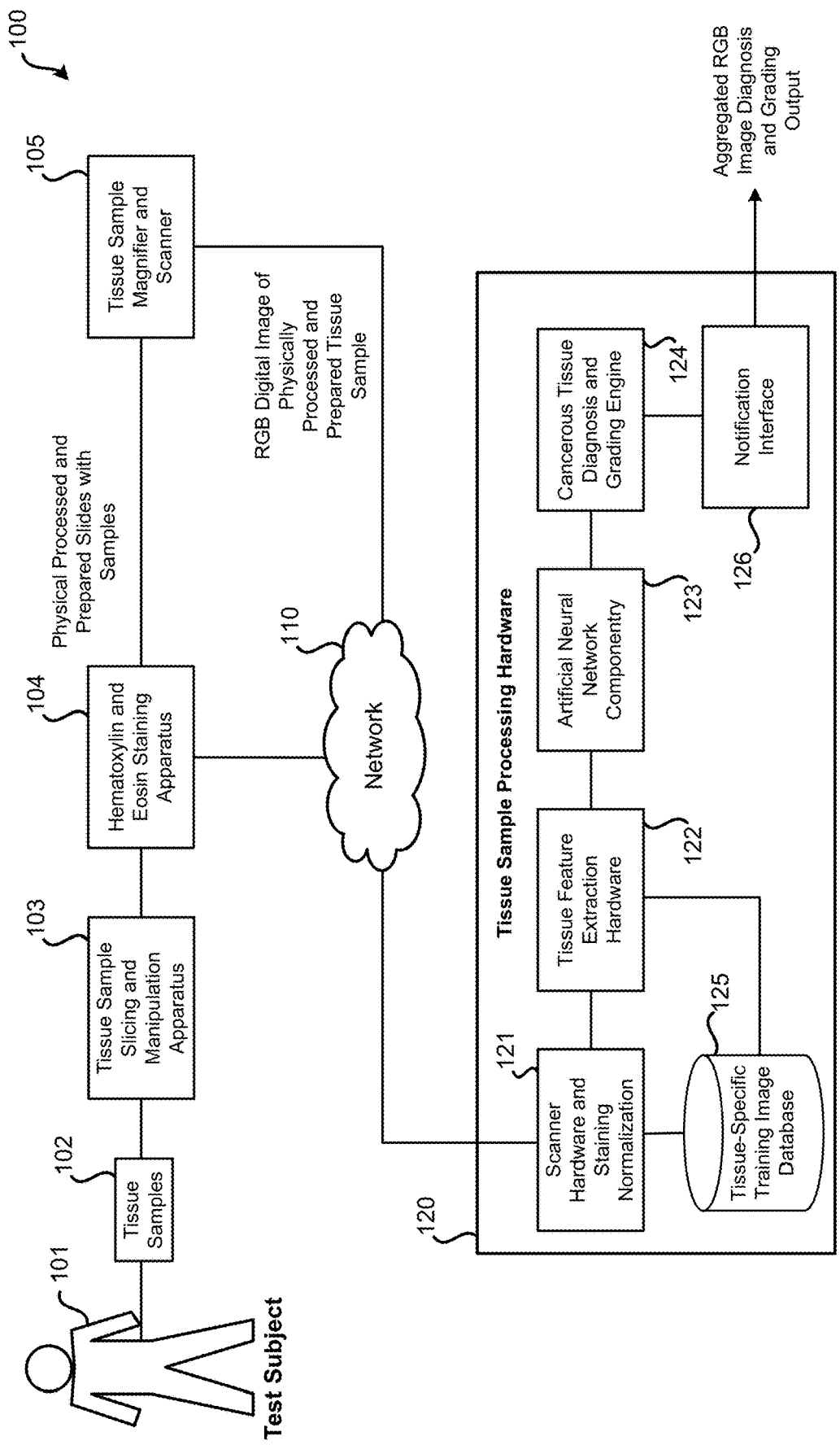
FIG. 1 illustrates an embodiment of a system for identifying and grading cancer in tissue samples.

FIG. 1 illustrates an embodiment of a system 100 for identifying and grading cancer in tissue samples. System 100 may include: tissue sample slicing and manipulation apparatus 103, hematoxylin and Eosin (H & E) staining apparatus 104, tissue sample scanner 105, network 110, and tissue sample processing hardware 120.

One or more tissue samples 102 may be gathered from a human test subject 101. In other embodiments, the one or more tissue samples may be gathered from a non-human test subject, such as some other type of mammal. Tissue samples 102 may then be processed to be placed into a form appropriate to be processed by tissue sample processing hardware 120, which can employ various processors, communication interfaces, non-transitory computer-readable mediums, software, and/or firmware to perform the functionality of components 121-126. Tissue sample slicing and manipulation apparatus 103 may be used to slice the one or more tissue samples into thin slices appropriate to be installed on a tissue slide, stained, magnified, and imaged. Tissue sample slicing and manipulation apparatus 103 may be in the form of an apparatus that slices the one or more tissue samples 102 to a defined thickness and size. The thickness may be selected such that, when stained, features particular to types of cells (e.g., cancerous, non-cancerous) in the tissue are apparent in the form of color, pattern, texture, and/or other characteristics. Once sliced and sized appropriately, the one or more tissue samples 103 may be places on tissue slides. Each tissue sample may be placed on a tissue slide appropriate for staining, magnification and scanning.

Hematoxylin and Eosin staining apparatus 104 may be used to apply Hematoxylin and Eosin to the tissue sample that has been sliced and placed on the slide. These stains may highlight features that can be used to distinguish between cancerous and non-cancerous cells and, if cancerous cells are present, identify the state or progression of the cancer. It may be possible to, in various embodiments, use other forms of stain to highlight and differentiate between cancerous and non-cancerous cells within the one or tissue samples 102. Hematoxylin and Eosin staining apparatus 104 may be used to apply an appropriate amount of each stain to the sliced and manipulated sample such that the sample is in an appropriate form for magnification and imaging.

Tissue sample magnifier and scanner 105 may be used to magnify and image the one or more stained tissue samples following staining using the Hematoxylin and Eosin staining apparatus 104. Tissue sample magnifier and scanner 105 can include optics that are adjustable or fixed, allowing magnification to be controlled and set to a particular level. Tissue sample magnifier and scanner 105 may further have an adjustable light source such that an appropriate level of light may be used to illuminate the one or more stained tissue samples. Tissue sample magnifier and scanner 105 may output a digitized magnified image (e.g., in an RGB format) of each stained tissue sample. Along with the digitized magnified RGB image, various parameters indicative of the image capture may be appended to the image file or stored separately, such as: magnification level, lighting level, white balance, tissue sample magnifier and scanner 105 make/model(s), a date and/or timestamp, etc.

Tissue sample processing hardware 120 may receive the one or more scanned, stained, and magnified digital tissue samples locally (e.g., directly from Tissue sample magnifier and scanner 105) or via a network. Network 110 may include one or more public and/or private networks, including an intranet and/or the Internet.

Tissue Sample Processing Hardware 120 may include: scanner hardware and staining normalization component 121, tissue feature extraction hardware 122, artificial neural network componentry 123, cancerous tissue diagnosis and grading engine 124, and tissue-specific training image database 125.

When a scanned image of a stained tissue sample is received by tissue sample processing hardware 120, scanner hardware and staining normalization component 121 may serve to adjust the image to compensate for the physical hardware and processes performed on the tissue sample. Data provided by tissue sample magnifier and scanner 105 may indicate, as previous discussed, data such as magnification level, lighting level, white balance, tissue sample magnifier and scanner 105 make/model(s). Based on this data, the image may be adjusted. In some embodiments, different image adjustment profiles may be stored by scanner hardware and staining normalization component 121 for various makes and models of tissue sample magnifiers and scanners 105. These profiles may adjust the images in accordance with peculiarities of these specific makes and models of the tissue sample magnifiers and scanners 105 such that the digital RGB image of the stained tissue sample is normalized and variances are eliminated or reduced based on the specific magnification and scanning hardware used. Similarly, scanner hardware and staining normalization component 121 may receive data from hematoxylin and eosin staining apparatus 104 that indicates information about the staining of the sample, such as the amount or concentration of stains used. The images may be adjusted by scanner hardware and staining normalization component 121 based on the concentration or types of stain used. In some embodiments, such parameters may be input by a user to tissue sample processing hardware rather than being passed electronically via network 110 (or directly) by hematoxylin and eosin Staining Apparatus 104 and/or tissue sample magnifier and scanner 105.

Tissue feature extraction hardware 122 may be used to perform various calculations of digital RGB images received by tissue sample processing hardware 120 (and, possibly, processed by scanner hardware and staining normalization component 121). A digital RGB image has image data divided into three color channels: red, green, and blue. Tissue feature extraction hardware 122 may be used to perform Shearlet transforms and calculate Shearlet coefficients (for magnitude and, possibly, phase) as detailed later in this document. Tissue feature extraction hardware 122 may be used to calculate Shearlet transforms and calculate Shearlet coefficients for received images of stained tissue samples to be tested and also of images of tissue samples that have been previously identified as cancerous (and, possibly, the associated grade) or non-cancerous. Such data can be used for training artificial neural network componentry 123. Tissue feature extraction hardware 122 may be implemented in the form of software or firmware executed by one or more processors on one or more computing systems, possibly using distributed computing.

Artificial neural network componentry 123 may create and execute neural networks based on an analysis of the training digital RGB images from tissue-specific training image database 125, and the associated Shearlet transforms and coefficients. These neural networks may be applied to varying decomposition levels of the Shearlet transforms and may be used to create multiple neural networks that, once trained, are used to assess RGB images of stained tissue samples under test. Artificial neural network componentry 123 may include various convolutional neural networks (CNNs) or other types of neural networks. The neural network architecture can be either shallow or deep. For instance, a single hidden layer (distinct from the input or output layer) may be present in a shallow network, or in a deep network it may be possible to have hundreds or even thousands of hidden layers. Further detail regarding artificial neural network componentry 123 is provided in relation to FIG. 7.

Cancerous tissue diagnosis and grading engine 124, based on the output of artificial neural network componentry 123, provides an assessment or diagnosis of whether cancerous tissue is present and/or provides a histological grade (e.g., according to the Gleason grading system). This output may be passed to notification interface 126. Notification interface 126 may serve to output the assessment or diagnosis, the histological grade, a copy of the RGB image, and parameters of the RGB image and/or staining (e.g., the parameters received from H&E staining apparatus 104 and/or tissue sample magnifier and scanner 105. This notification may be transmitted via a network to destination associated with test subject 101 or a medical professional overseeing testing of test subject 101. The notification may take the form of a database write, email, encrypted message, text message, output to a display device, or file that may include both images (e.g., the RGB images of the one or more samples), the parameters, and the diagnosis and/or grading.

Figure 2A:
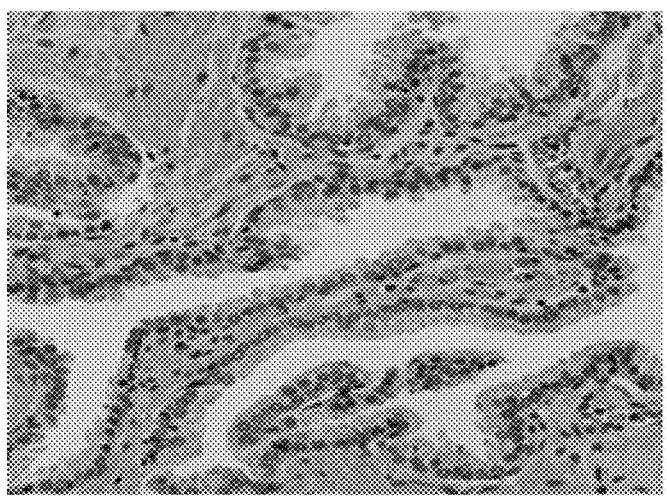
FIGS. 2A, 2B, and 2C, which are color drawings, show sample sliced, stained, magnified, and scanned prostate tissue RGB images.
Figure 2B:
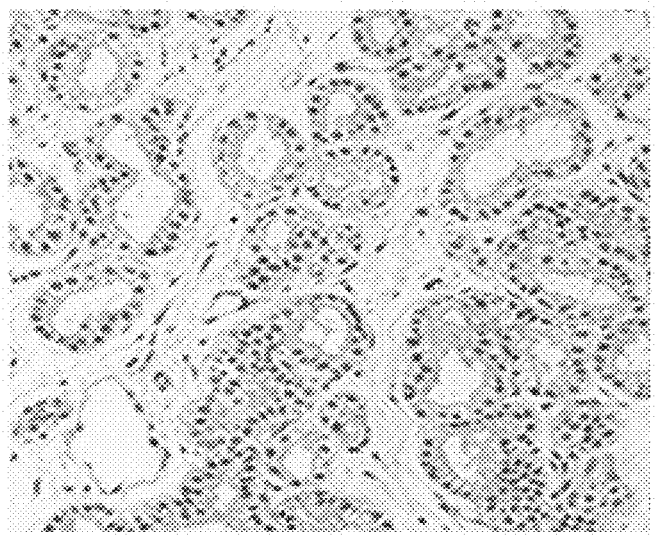
Figure 2C:
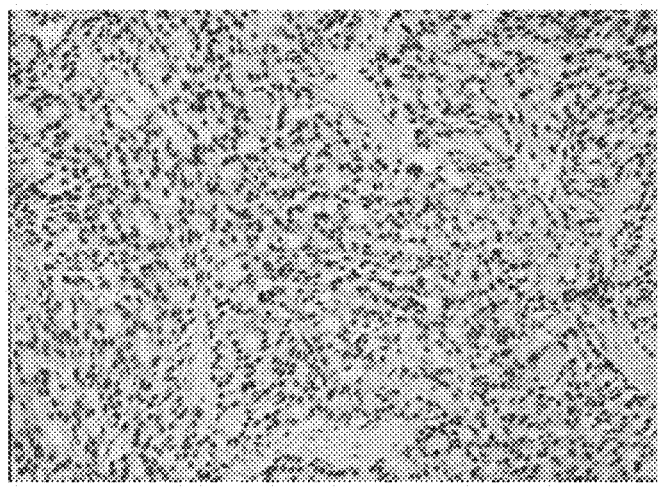

FIGS. 2A-C show specific examples of prostate tissue biopsy images to help understand the architecture of normal and malignant tissues. In these images, the tissue has been sliced, stained, magnified, and digital imaged, such as by system 100 using tissue sample slicing and manipulation apparatus 103, H&E staining apparatus 104, and tissue sample magnifier and scanner 105. FIG. 2A shows normal prostate tissue consisting of gland units surrounded by stroma. Each gland unit is composed of rows of epithelial cells located around the lumen. When cancer occurs, epithelial cells replicate in an uncontrolled way, disrupting the regular arrangement of gland units, as shown in FIGS. 2B and 2C. Furthermore in contrast to normal and benign cells which are typically uniform in appearance, malignant cells are characterized by irregular morphology that is reflected in several parameters. Most of the criteria of malignancy are seen in the nuclei of the cells. However, there is valuable information in the cytoplasm as well. The nuclei of malignant cells are larger than those of benign cells, vary in size and shape. Also, malignant cells tend to lack sufficient cytoplasm. As the nuclear enlargement is not accompanied by similar enlargement of the cytoplasm, the ratio of the area of the nuclei to that of the cytoplasm of the cells is increased. In the internal structure of the nuclei, the chromatin is irregularly distributed and exhibits coarse granularity and irregular clumping. FIG. 2B shows a Gleason grade 2 malignant tissue while FIG. 2C shows a Gleason grade 5 malignant tissue. With increasing malignancy level as shown in FIG. 2C the lumens have been filled with epithelial cells and the stroma has virtually disappeared.

Figure 3:
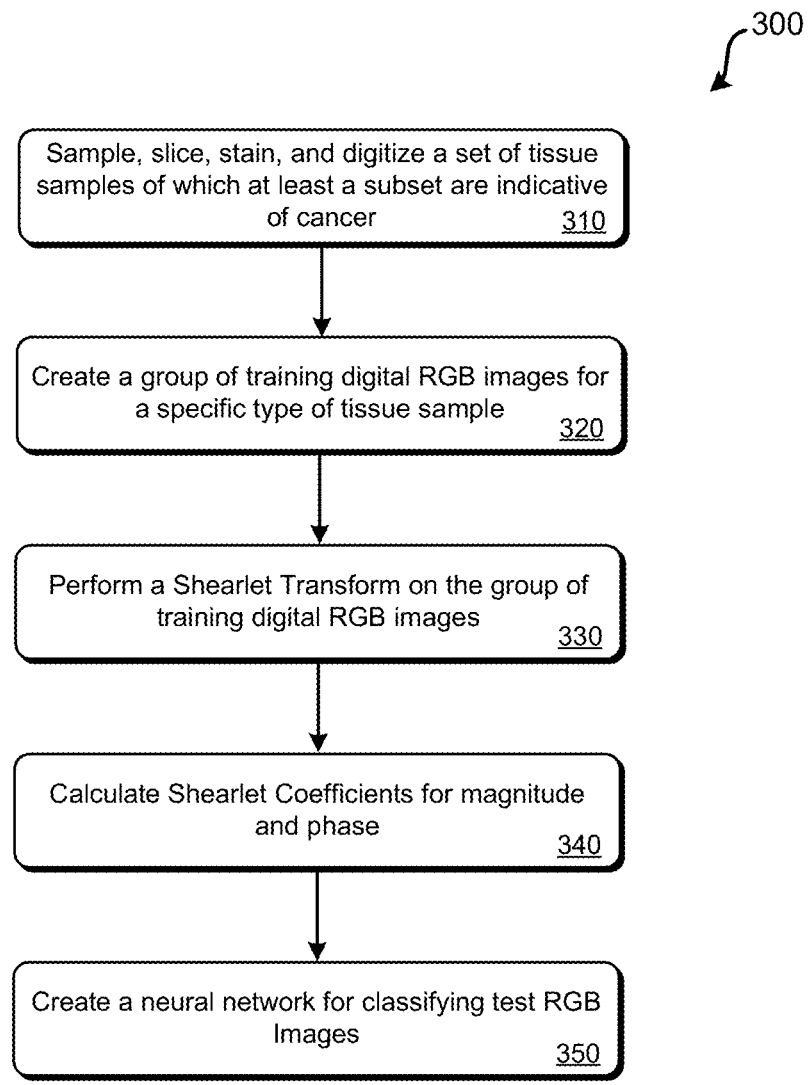
FIG. 3 illustrates an embodiment of a method of using Shearlet transforms and coefficients to train tissue sample processing hardware.

FIG. 3 illustrates a method 300 of using Shearlet transforms and coefficients to train tissue sample processing hardware. Method 300 may be performed using a system that can be used to obtain, stain, scan, and analyze tissue samples, such as system 100 of FIG. 1. At block 310, a set of tissue samples may be obtained, sliced, stained, and digitized into a set of digital RGB images. Each image of the set may correspond to a particular type of tissue, such as prostate or breast tissue. At block 310, the images may also be normalized to account for hardware, magnification, and staining variations as detailed in relation to system 100. At block 320, the RGB images of the tissue may be used to create a training data set by having each image of this set associated with an indication of whether cancer is present and/or an identified grade (e.g., according to the Gleason scale for prostate tissue) according to a known, accurate method (e.g., human inspection). It may be possible to increase the number of training images available in the training data set by flipping and/or rotating images and/or dividing images into multiple, smaller images.

Once the group of training digital RGB images of the specific type of tissue sample has been obtained, at block 330, a Shearlet transform may be performed on each image of the group of training RGB images. Shearlet transforms can be used in various embodiments for measuring the local structure of image textures. Shearlet transforms can be effective for two-dimensional data, such as RGB images. Shearlet transforms include a family of transforms that are designed to effectively capture directional features, such as orientations of curves and edges, in addition to points in images. The images of FIGS. 2A-2C highlight the changes in texture due to malignancy: the texture becomes finer as the epithelial cell nuclei grows in an uncontrolled manner and spread across the tissue. Various embodiments disclosed herein use versions of the Shearlet transform to represent the local structure of textures in the digital image of the tissue sample.

There are several advantages in using the Shearlet transform for texture analysis. The Shearlet transforms depend on three parameters: scale, location, and direction. Further, Shearlet transforms provide directional representation systems which deal with anisotropic features in both the continuous and discrete domains. Shearlet transforms provide an effective approach for combining geometry and multiscale analysis by taking advantage of the classical theory of affine systems. The continuous Shearlet transform is defined using a reference function $\Psi$ as follows: for a function $f \in L^2(R^2)$, for variables $a \in R$, $s \in R$, and $t \in R^2$, then:

$$SH_\Psi f(a,s,t) := \langle f, \Psi_{a,s,t} \rangle,$$

$$a > 0, s \in R, t \in R^2 \quad (1)$$

$\Psi_{a,s,t}$ is defined by:

$$\Psi_{a,s,t}(x) = |\det M_{a,s}|^{-1/2} \Psi(M_{a,s}^{-1} x - t). \quad (2)$$

The matrix $M_{a,s}$ is defined by:

$$M_{a,s} = \begin{pmatrix} a & \sqrt{a} s \\ 0 & \sqrt{a} \end{pmatrix} = B_s A_a \quad (3)$$

The matrices $B_s$ and $A_a$ are given by, respectively:

$$B_s = \begin{pmatrix} 1 & s \\ 0 & 1 \end{pmatrix} \quad (4)$$

$$A_a = \begin{pmatrix} a & 0 \\ 0 & \sqrt{a} \end{pmatrix} \quad (5)$$

The parameter a represents a scale or dilation value, s represents a shear, and t represents a translation. In some embodiments the mother Shearlet function $\Psi$ can be defined almost like a tensor product by $\Psi(\xi_1,\xi_2) = \psi_1(\xi_1)\psi_2(\xi_2/\xi_1)$ where $\psi_1$ is a wavelet (e.g. a Meyer wavelet) and $\psi_2$ is a bump function.

Referring to system 100, tissue sample processing hardware 120 may use tissue feature extraction hardware 122 to perform blocks 330 and 340 of method 300. At block 330, a Shearlet transform may be performed. To apply the continuous Shearlet transform function to RGB images of stained tissue samples, a pre-built mathematical toolbox may be used, such as a Shearlet-specific toolbox that can be implemented in MathWork's® MATLAB. Specifically, a fast finite Shearlet transform (FFST) may be performed using a toolbox that can utilize the math of equations (1) through (5). A FFST uses fast Fourier transform (FFT) for discrete implementation of a Shearlet transform in frequency domain and consequently produces complex Shearlet coefficients. This implementation of Shearlet transforms allows phase to be obtained from the complex Shearlet coefficients that are calculated. Five decomposition levels may be used for the Shearlet transformation. The first decomposition level can be a low pass filtered version of input. Eight directions may be used for the second and third levels and 16 directions for the fourth and fifth levels which led to 8, 8, 16, and 16 subbands, respectively. Therefore, overall 49 subbands of Shearlets can be obtained. Each of these subbands were of the same size as input image (e.g., 150×150).

At block 340, Shearlet coefficients may be calculated for magnitude and phase. A complex Shearlet coefficient is represented by:

$$c(a,s,t)=x+iy \quad (6)$$

In (6), x and y are the real and imaginary parts of a complex Shearlet coefficient and a, s, and t are the scale, shear, and translation parameters of the Shearlet transform, respectively. The magnitude and phase of Shearlet transforms can be represented, respectively, as:

$$mag(a, s, t) = |c(a, s, t)| = \sqrt{x^2 + y^2} \quad (7)$$

$$phase(a, s, t) = \angle(c(a, s, t)) = \tan^{-1}\left(\frac{y}{x}\right) \quad (8)$$

Phase of Shearlet coefficients can be especially useful as phase can be invariant in the presence of noise and image contrast. As such, the use of the Shearlet coefficient phase can eliminate or reduce the need for scanner hardware and staining normalization since contrast variations and/or noise effects that may be introduced by tissue sample magnifier and scanner hardware.

At block 350, a neural network is then created using the Shearlet coefficients for magnitude and phase for each training image as determined at block 340. Block 340 further uses the diagnosis and, if available, grading associated with each training image. Further detail regarding the creation of the neural network is provided in relation to FIG. 9.

Figure 4A:
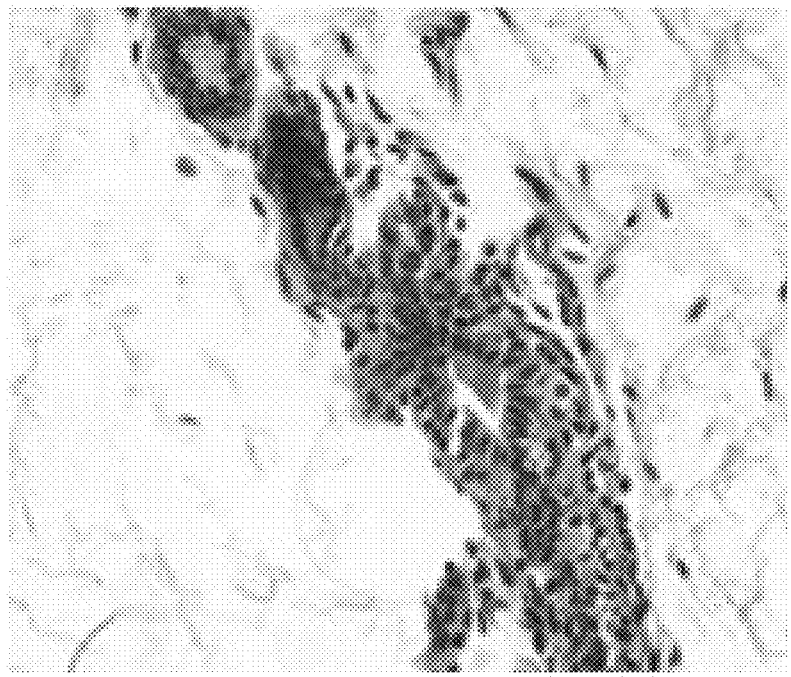
FIG. 4A, a color drawing, represents an embodiment of a sample RGB image of a benign tissue sample.
Figure 4B:
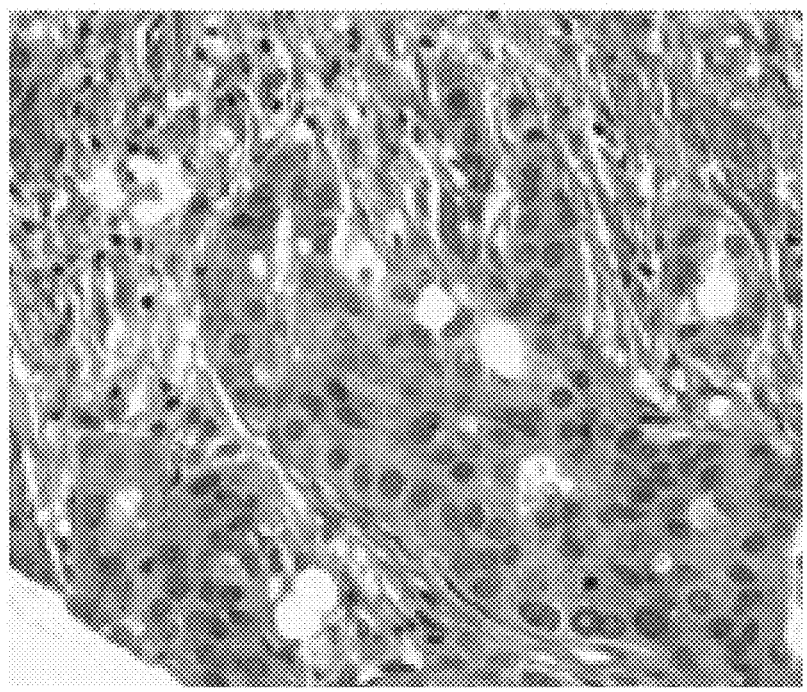
FIG. 4B, a color drawing, represents an embodiment of a sample RGB image of a malignant tissue sample.
Figure 4C:
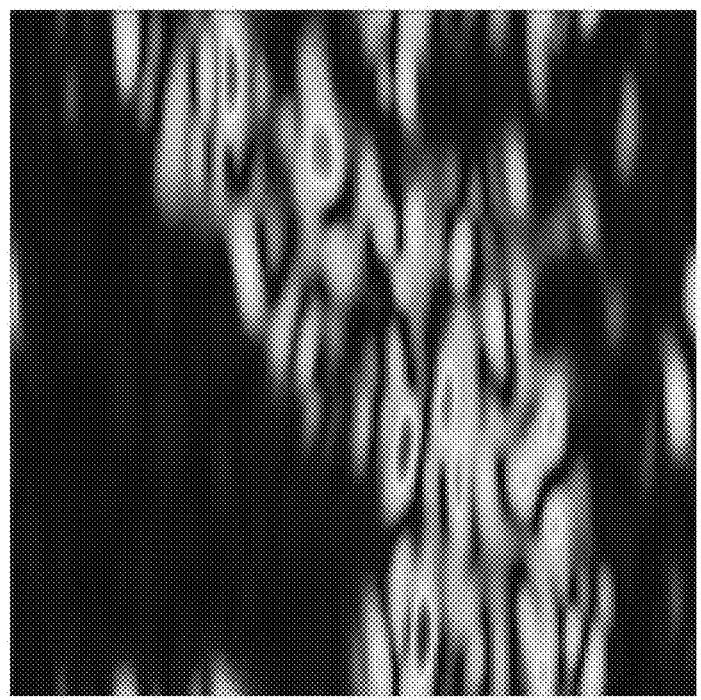
FIG. 4C, a color drawing, represents an embodiment of an image representing Shearlet coefficient magnitudes of the image of FIG. 4A.
Figure 4D:
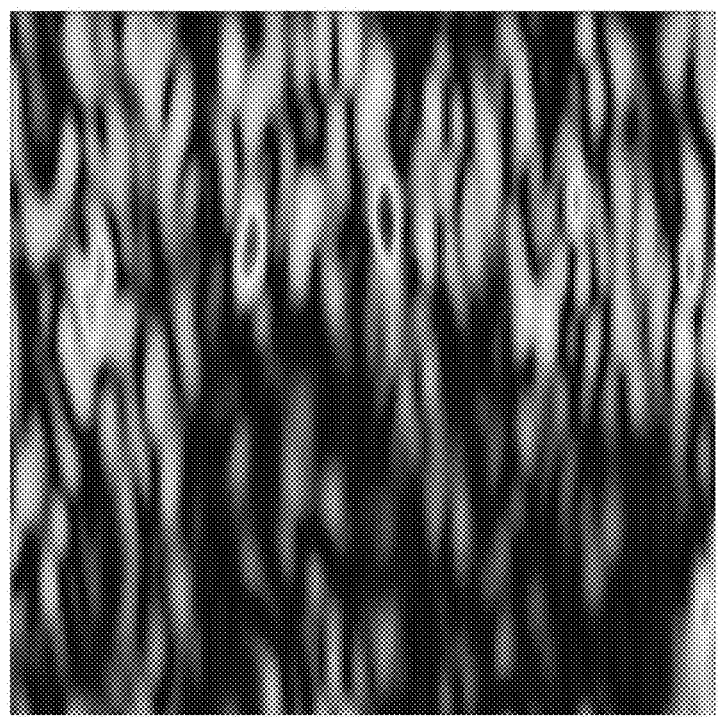
FIG. 4D, a color drawing, represents an embodiment of an image representing Shearlet coefficient magnitudes of the image of FIG. 4B.
Figure 4E:
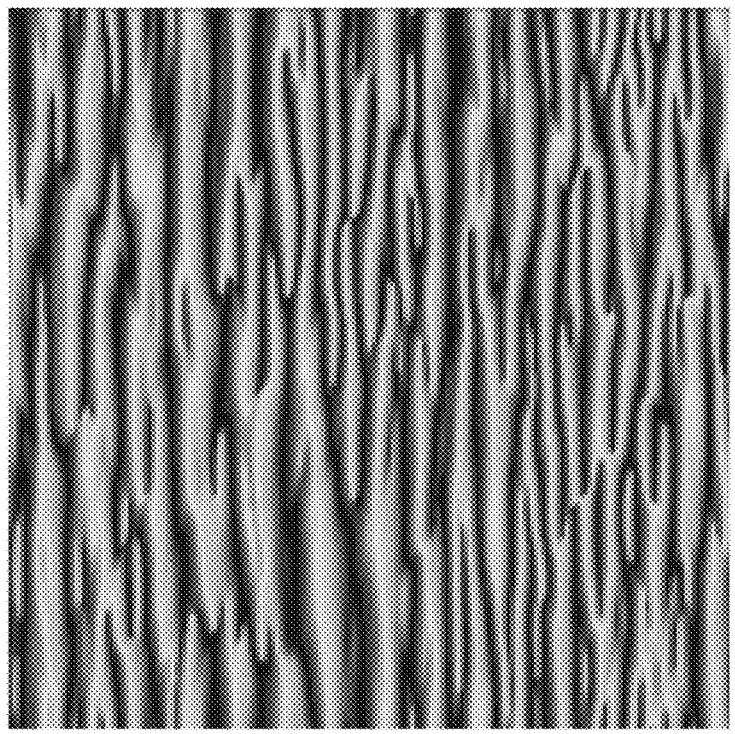
FIG. 4E, a color drawing, represents an embodiment of an image representing Shearlet coefficient phases of the image of FIG. 4A.
Figure 4F:
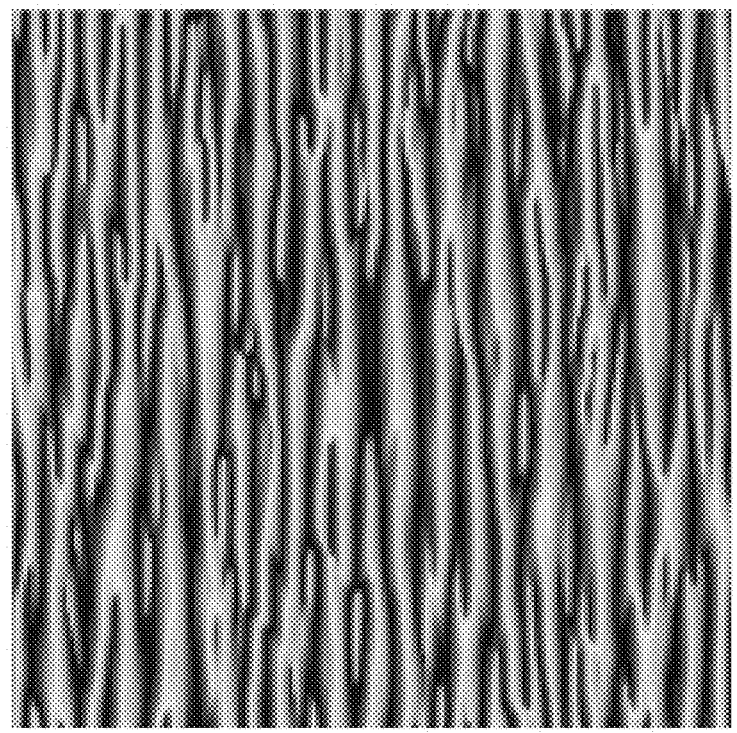
FIG. 4F, a color drawing, represents an embodiment of an image representing Shearlet coefficient phases of the image of FIG. 4B.

The differences between Shearlet coefficients for benign (non-cancerous) and malignant (cancerous) tissue of a particular type can be visually observed in FIGS. 4A-4F. FIG. 4A represents a sliced, magnified, and stained sample of benign tissue. FIG. 4B represents a sliced, magnified, and stained sample of malignant tissue. FIG. 4C represents magnitudes of Shearlet coefficients for the image of FIG. 4A. FIG. 4D represents magnitudes of Shearlet coefficients for the image of FIG. 4B. FIG. 4E represents phases of Shearlet coefficients for the image of FIG. 4A. FIG. 4F represents phases of Shearlet coefficients for the image of FIG. 4B.

Figure 5:
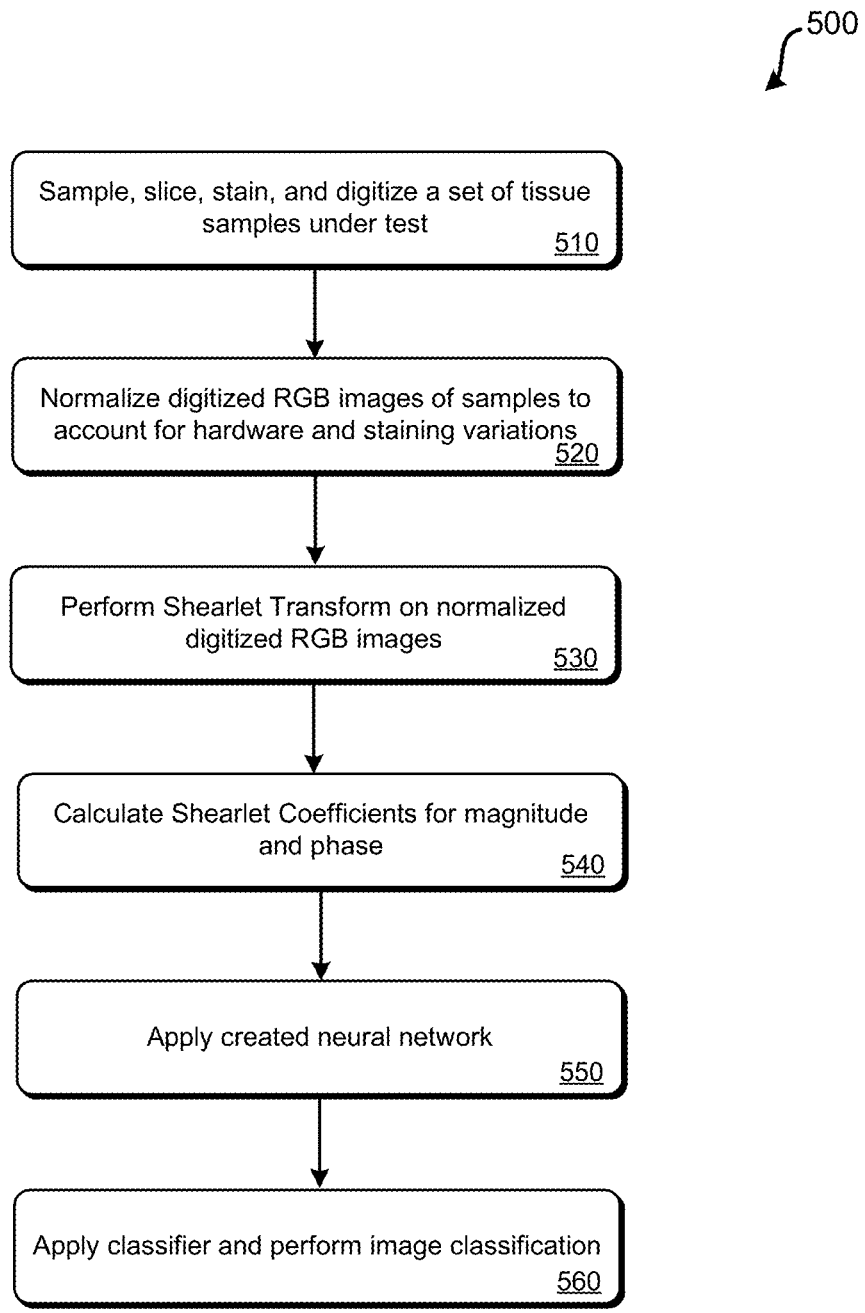
FIG. 5 illustrates an embodiment of a method for using Shearlet transforms and coefficients to diagnose and classify images of stained tissue samples.

FIG. 5 illustrates an embodiment of a method 500 for using Shearlet transforms and coefficients to diagnose and classify images of stained tissue samples. Method 500 may be performed using a system that can be used to obtain, stain, scan, and analyze tissue samples, such as system 100 of FIG. 1. At block 510, one or more tissue samples may be obtained, sliced, stained, and digitized into a set of digital RGB images. Each of the one or more images obtained may correspond to a particular type of tissue, such as prostate or breast tissue. For this particular type of tissue, a neural network of tissue sample processing hardware has already been trained. At block 520, the images may also be normalized to account for hardware, magnification, and staining variations as detailed in relation to system 100.

At block 530, a Shearlet transform may be performed for each of the one or more images of the stained tissue samples. Block 530 may be performed in accordance with the detail provided in relation to block 330. At block 540, Shearlet coefficients for magnitude and phase may be obtained for each of the one or more images of the stained tissue samples based on the Shearlet transforms of block 530. Block 540 may be performed in accordance with the detail provided in relation to block 340.

At block 550, the neural network that was previously created is applied. Further details regarding the application of the neural network is provided in relation to FIG. 9. The neural network used at block 550 can represent a deep neural network or convolutional neural networks (CNN). At block 560, a classifier, such as the softmax classifier based on the softmax function can be applied to assess the quality of images based on the output of the applied created neural network. The softmax function may be useful when grouping into more than two categories is to be performed. Since grading can be performed on the Gleason grading scale, grouping into more than two categories is desired (e.g., the five levels of the Gleason grading scale). The output of the softmax function indicates a probability of the sample of the analyzed image being part of a particular class, such as having a particular Gleason grade. While some embodiments use the softmax function, it should be understood that other logistic regression functions that can be used for classifying into more than two classes. As an example, support vector machines (SVMs) may be used instead of the softmax function. In some embodiments, it may be possible to use a logistic regression function that classifies into only two classes if only a determination of whether or not cancer is present. Therefore, at block 560 the input image has been classified probabilistically into: 1) whether cancer has been determined to be present; and/or 2) a particular cancer grade.

Figure 6:
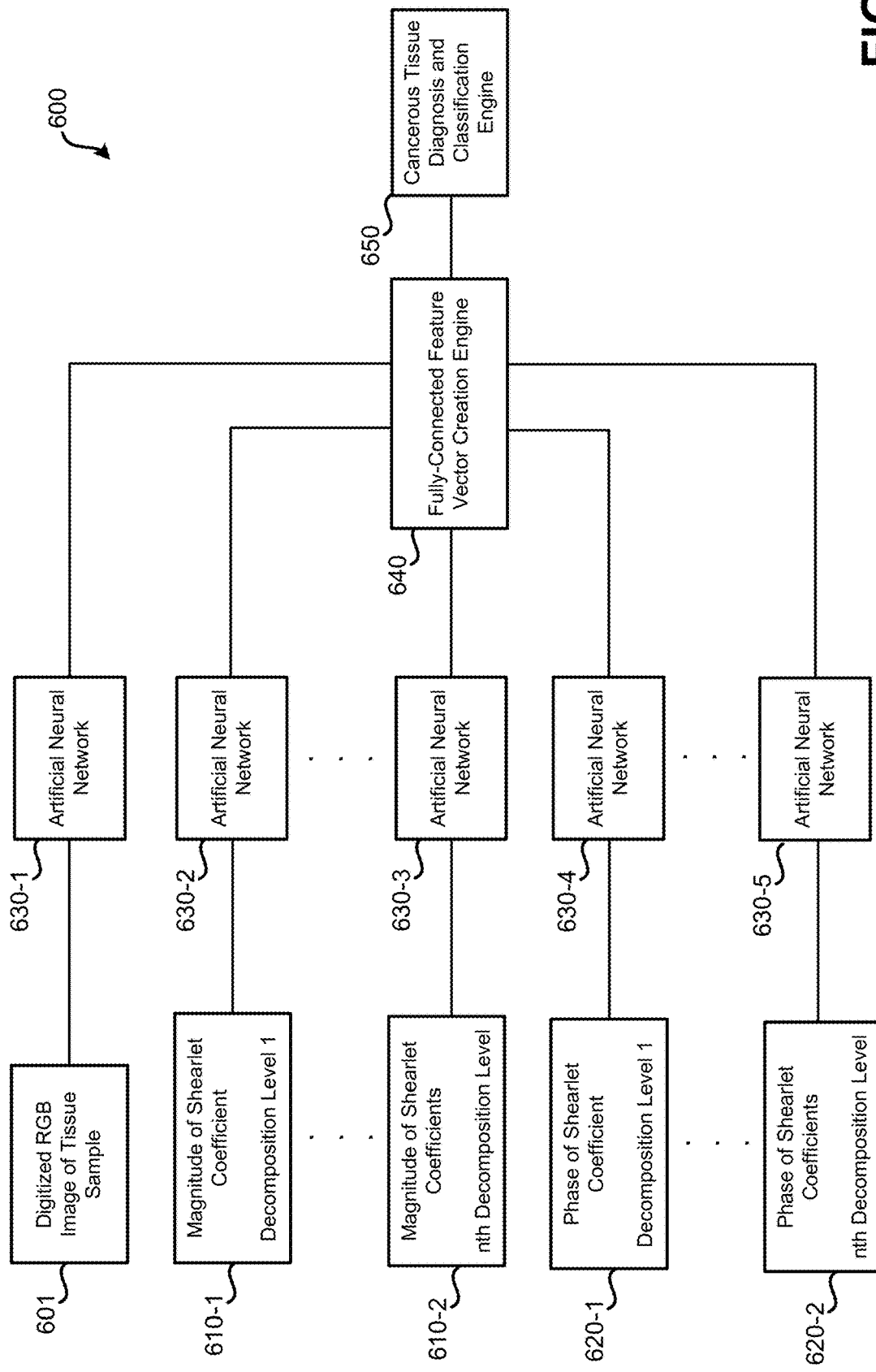
FIG. 6 illustrates an embodiment of a tissue feature extraction and neural network componentry system.

FIG. 6 illustrates an embodiment of a tissue feature extraction and neural network componentry system 600. System 600 can represent aspects of tissue feature extraction hardware 122, artificial neural network componentry 123, and cancerous tissue diagnosis and grading engine 124 in greater detail than in FIG. 1. In system 600, the digitized RGB image 601 of the stained tissue sample, and multiple magnitude and phase Shearlet coefficients corresponding to different decomposition levels are fed into separate neural networks 630. In some embodiment, five decomposition levels are used for each of the Shearlet magnitude coefficients and Shearlet phase coefficients. It should be understood that in other embodiments, a greater or fewer number of decomposition levels may be used in system 600. As illustrated, an indefinite number of decomposition levels for magnitude and phase are calculated and used: magnitude of Shearlet coefficient 610-1 represents the first decomposition level and magnitude of Shearlet coefficient 610-2 represents the nth decomposition level; and phase of Shearlet coefficient 620-1 represents the first decomposition level and phase of Shearlet coefficient 620-2 represents the nth decomposition level.

Each of artificial neural network processors 630 represent neural networks that can be executed using various processing resources (e.g., distributed computing, etc.). Artificial neural network processors 630 may each be part of a deep neural network or convolutional neural network (CNN) that can evaluate two-dimensional data. Convolutional neural networks are feed-forward networks that include consecutive pairs of convolutional and pooling layers along with fully-connected layers. CNNs can receive input represented as two-dimensional data (e.g. images). The input data may first go through pairs of convolution and pooling layers. Convolution layers can apply two dimensional convolution on their inputs using rectangular filters which are applied in different positions of the input. The convolution layer sums the responses from previous layer, adds a bias term, and drives the result through a nonlinear activation function.

This process can be repeated with different weights to create multiple feature maps. The output of the convolutional layer may then be passed through a pooling layer (which is a downsampling technique) and may result in translation-invariant features. After a few pairs of convolution and pooling layers, one or more fully connected layers combine the outputs into a feature vector. The final layer is a fully connected layer, represented by fully-connected feature vector creation engine 640, with one neuron per class (two for breast cancer diagnosis, four for Gleason grading). The output of the fully-connected feature vector creation engine 640 is output to cancerous tissue diagnosis and classification engine 650, which can use the softmax function to classify on a cancer grading scale the output vector of fully-connected feature vector creation engine 640. Throughout the whole process, the weights are optimized by minimizing the misclassification error using stochastic gradient descent method.

Figure 7:
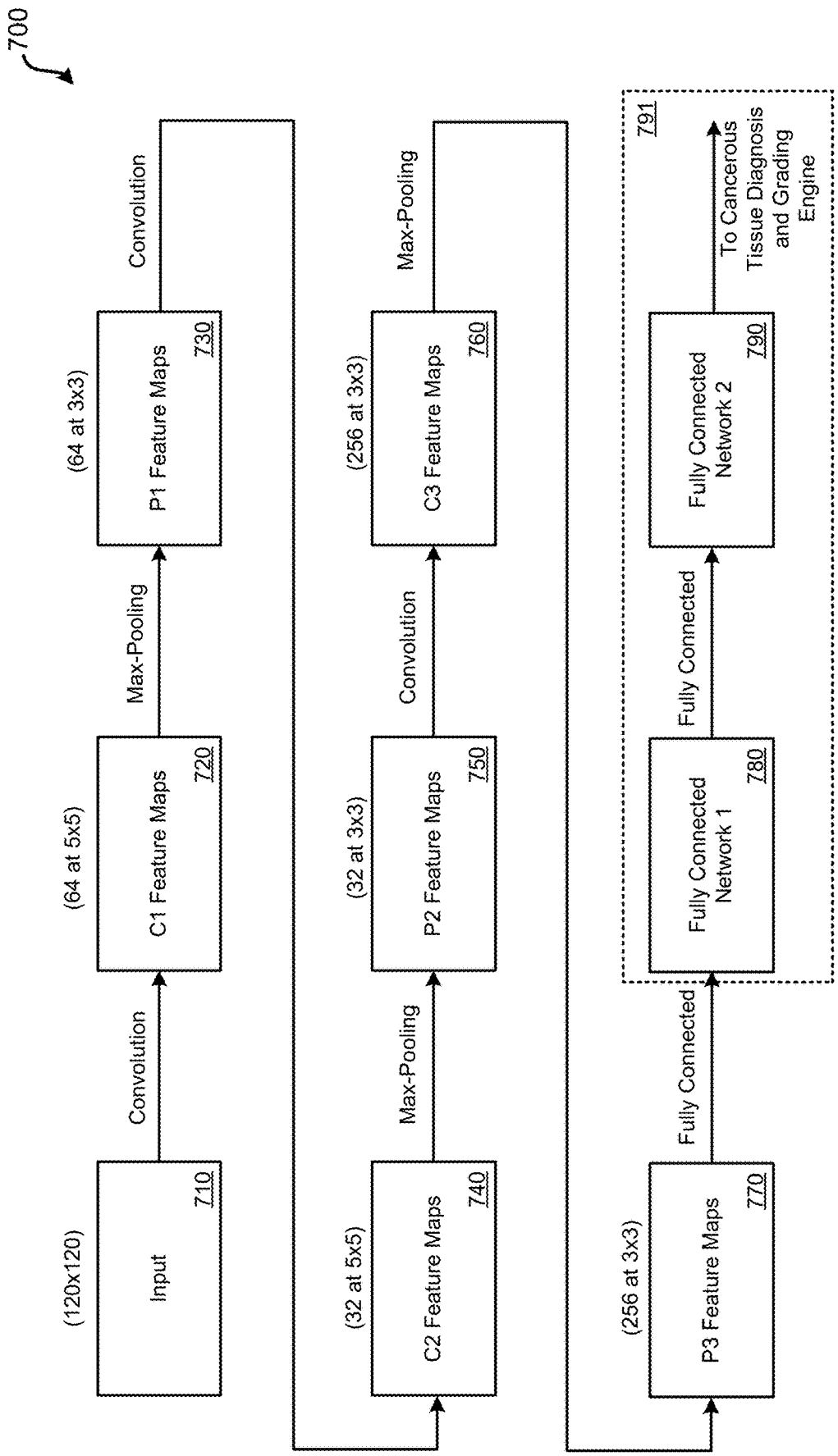
FIG. 7 illustrates an embodiment of a convolutional neural network (CNN).

FIG. 7 illustrates an embodiment of a convolutional neural network (CNN) 700. CNN 700 represents one type of neural network that may be used to perform the functionality of artificial neural network componentry 123, it should be understood that other forms of neural networks may alternatively be used. Referring to tissue sample processing hardware 120 of FIG. 1, artificial neural network componentry 123 may perform the functions of CNN 700. CNN 700 may accept a patch of an RGB image as input (such as a 120×120 pixel patch), magnitudes of Shearlet coefficients, or phases of Shearlet coefficients. Input component 710 may serve to receive the input to be processed by the CNN. Input component 710 receives the RGB image, magnitude, and phase of the Shearlet coefficients. Each of the RGB image, magnitude (for each decomposition level), and phase (for each decomposition level) is fed to a separate instance of CNN 700. A reason for using separate instances of CNN 700 for the RGB and Shearlet data is because they were of different nature and therefore needed separate processing. Similarly, separate instances of CNN are used for magnitude and phase of Shearlets. Shearlet coefficients from different decomposition levels are also processed independently using separate instances of CNN 700 because different decomposition levels can represent features from different scales.

A convolutional layer can be applied to input 710, P1 Feature Maps 730, and P2 Feature Maps 750. In each instance in CNN 700, the convolution layer can apply a two dimensional convolution on the input feature maps using 64 Gaussian filters of size 5×5 initialized with standard deviation of 0.0001 and bias of zero. It should be understood that the number and characteristics of the Gaussian filters may be varied; for example, if the input image size is other than 120×120, the filter size may be altered and/or the number of applied filers may be altered. The convolutional layer may step 2 pixels between each filter application. The output may then be processed using a nonlinear Rectified Linear Unit (ReLU) function which is defined as $f(z)=\max(z, 0)$. This nonlinear activation function may let the network to learn abstracts using a small number of nodes. Otherwise, if a linear function was used, the entire network would be equivalent to a single-layer neural network.

A max-pooling layer can be applied to C1 Feature Maps 720, C2 Feature Maps 740, and C3 Feature Maps 760. The purpose of each pooling layer is to combine similar features into one. Therefore, the max-pooling layers can be understood as a feature dimension reduction technique. The max-pooling layers calculate the maximum of a local patch of units inside a 3×3 region of input feature map and steps two pixels between pooling regions. Characteristics of the max-pooling layers can be adjusted for a different input region or for stepping a different number of pixels between pooling regions. This can help the learned features be invariant to shifts and distortions. Other non-linear functions besides max pooling may be used to perform the pooling.

Local Response Normalization (LRN) can be applied to P1 Feature Maps 730 and P2 Feature Maps 750. LRN may be useful when using an artificial network having unbound activation (e.g., rectified linear neurons). Such an arrangement can allow for the detection of features with a big neural response, while limiting the response that are uniformly large in a local neighborhood. LRN may be performed, for example, by dividing each input by $$\left(1 + \frac{\alpha}{n}\left(\sum_i x_i^2\right)\right)^\beta$$

where $x_i$ is the i-th input, n=3 is the size of local region, $\alpha=5\times10^{-5}$ and $\beta=0.75$.

Illustrated in FIG. 7 are the number of filters applied to the output of the previous layer and the size of the applied filters. It should be understood that the number of filters at each layer of the CNN and the size of each filter varies based on the input image. Further while CNNs are applied in FIG. 7, it should be understood that other forms of neural networks, and, more generally, learning networks may be used in embodiments of system 100 or the methods of FIGS. 3 and 5.

The fully connected network layers (780 and 790), process P3 Feature Maps 770 and take the output of the pooling layers as input and combines them into a feature vector. The fully connected layers can be understood as the "high level reasoning" layers, which takes information derived from all of the previous neural network processing to output a weighted sum at will be used to classify the image of the tissue. The use of multiple fully-connected layers has been found empirically to yield better results and accuracies than a single fully-connected network layer. In other embodiments a single fully-connected layer or more than two fully-connected layers may be implemented. While many instances of neural networks may be present, as illustrated by neural network processors 830, only an instance of components 791 may be present that are used to combine the outputs of the CNNs. Components 791 are represented in FIG. 6 as fully-connected feature vector creation engine 640.

Table 1 represents a set of results that were obtained using method 500 of FIG. 5 and system 100 of FIG. 1. "True Label" refers to the known grade of a tissue sample (as determined by experts), and "Predicted Label" refers to the grade determined by the classification. Therefore, for example, 100% of the grade two samples were properly classified as grade two using method 500, and 56% of grade five samples were properly classified as grade five.

TABLE 1

|  |  | Predicted Label (%) | | | |
| --- | --- | --- | --- | --- | --- |
|  |  | Grade 2 | Grade 3 | Grade 4 | Grade 5 |
| True Label | Grade 2 | 100 | 0 | 0 | 0 |
|  | Grade 3 | 0 | 100 | 0 | 0 |
|  | Grade 4 | 0 | 0 | 100 | 0 |
|  | Grade 5 | 7 | 0 | 37 | 56 |

While the above embodiments are focused on using neural networks that are trained using training images to identify and grade images of stained cancerous tissue, in other embodiments, rather than using neural networks, hand-crafted feature extraction operations may be used in combination with Shearlet transforms to identify and classify cancerous tissue. Such multiple hand-crafted feature extraction operations may have their results fused using Multiple Kernel Learning (MKL) algorithms in order to output a result that can be used to determine a diagnosis and/or classification.

A first of the feature extraction operations uses a Shearlet transform and its coefficients, in conjunction with calculating co-occurrence matrix of the coefficients, for texture feature analysis as part of grading cancer, such as Gleason grading of prostate cancer. Other feature extraction operations that may be used include morphological feature extraction from a segmentation of the digital image of the tissue sample, and pixel intensity methods. One embodiment of a pixel intensity method converts the digital image of the tissue sample into a plurality of images having respective color spaces (e.g., red/green/blue (RGB) and hue/saturation/value (HSV)), and applies histogram counts for the color channels. Another embodiment of a pixel intensity method determines a co-occurrence matrix from a grey scale of the digital image of the tissue sample, extracts statistical values from a co-occurrence matrix of the grey scale pixel array, and correlates the statistical values to grades, such as the Gleason grade. Details on these feature extraction operations are given below.

Some embodiments that use multiple feature extraction processes then utilize versions of Support Vector Machines supervised learning using a Multiple Kernel Learning algorithm for fusing the different types of features. Multiple Kernel Learning methods aim to construct a kernel model where the kernel is a linear combination of fixed base kernels. Learning the kernels then consists of learning the weighting coefficients for each base kernel, rather than optimizing the kernel parameters of a single kernel. An advantage of using MKL is in the nature of the classification problem to be solved. Since these embodiments yield different types of features extracted from images of the tissue sample and each set of these features may require a different notion of similarity (a different kernel), instead of building a specialized kernel for such applications, it is possible to just define a kernel for each of these modes and linearly combine them. This can eliminate the need for a feature selection algorithm.

Figure 8:
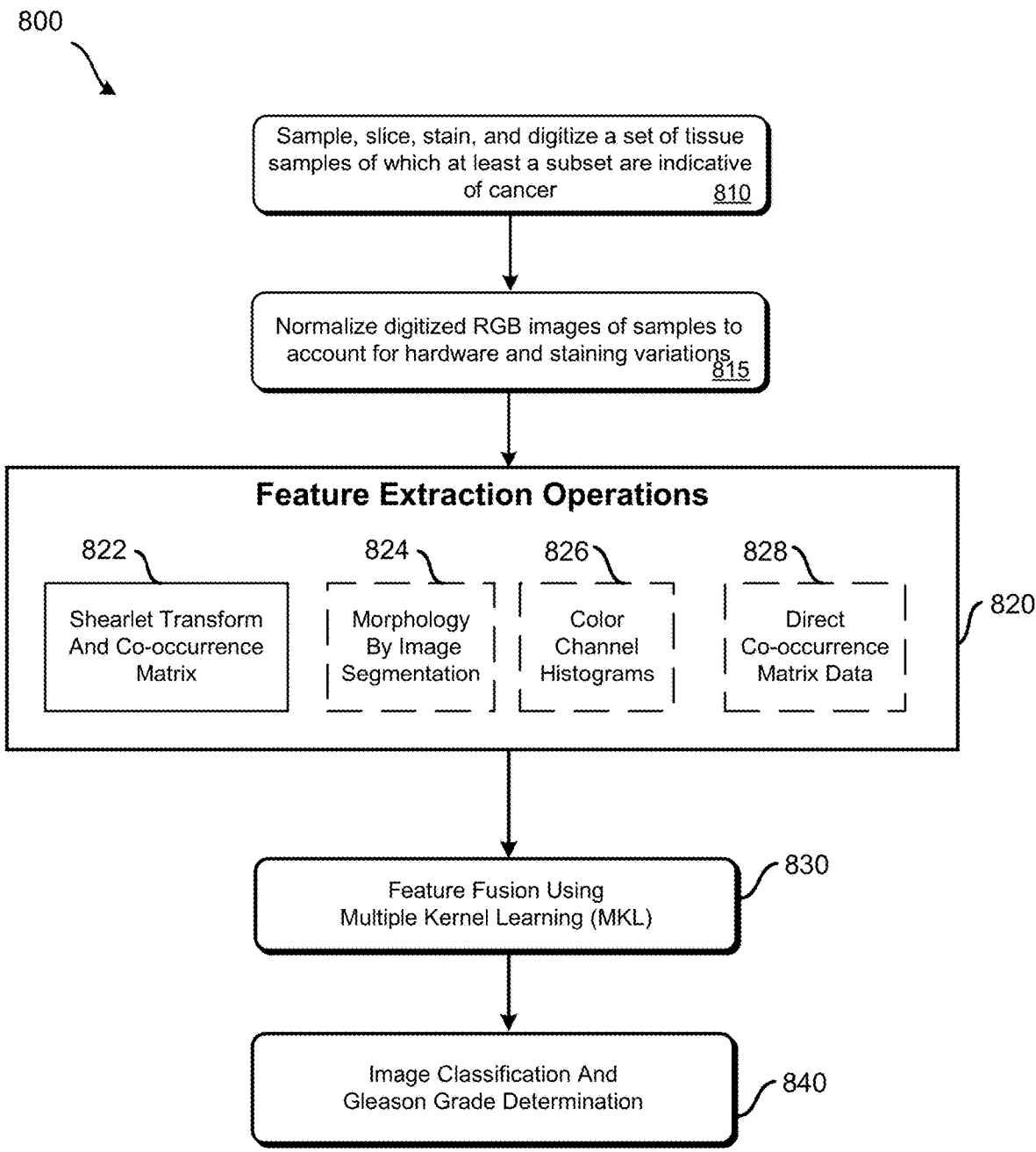
FIG. 8 illustrates an embodiment of a method for determining a grade of a cancer of a tissue sample using multiple feature extraction operations.

FIG. 8 illustrates an embodiment of a method 800 for determining a grade of a cancer of a tissue sample using multiple feature extraction operations. Method 800 may be performed using system 100 of FIG. 1. Rather than system 100 having artificial neural network componentry 123, componentry may be implemented that allows for performance of multiple feature extraction operations, such as morphology by image segmentation 824, color channel histograms 826, and direct co-occurrence matrix data 828.

At block 810 a tissue sample is obtained, which may have been stained for imaging. An example is applying H&E staining to prostate tissue. Then the tissue sample is converted to a digital image, comprising an array of pixel values. The digital image of the tissue sample may in any of a variety of color spaces, such as RGB, RGBα (RGB with transparency), HSV, or other color spaces. Alternatively or additionally, the digital image of the tissue sample may be recorded in a grey scale format. Initial formatting or pre-filtering (e.g., noise filtering or anti-aliasing filtering) may be applied to the digital image before input into the methods and systems. The embodiments of the methods and systems receive such digital images of tissue sample as inputs. At block 815, the images may also be normalized to account for hardware, magnification, and staining variations as detailed in relation to system 100.

At block 820, at least one feature extraction operation is performed using the digital image of the stained tissue sample. The first feature extraction operation 822 comprises performing a discrete Shearlet transform on the digital image data. This calculates a plurality of Shearlet coefficients from the pixel values of the digital image data. The discrete Shearlet transform may be applied to the pixel values in color channels of the digital image data, or directly to pixel values in a grey scale digital image.

After calculating the Shearlet coefficients, a co-occurrence matrix is generated using the Shearlet coefficients. From the co-occurrence matrix statistical values are calculated. These statistics provide a correlation with the cancer grade.

Optionally, other embodiments may use one or more other additional feature extraction operations. One such feature extraction operation 824 comprises extracting morphological features, such as nuclei of malignant cells, by performing image segmentation on the digital image. Embodiments may use a preliminary segmentation together with a mean shift algorithm in image segmentation to obtain values corresponding to the number of nuclei in malignant cells.

Other optional additional feature extraction operations 826 are based on using pixel intensity values, such as in color channels of color digital image. In various embodiments of such feature extraction operations, the digital image of the tissue sample is converted to multiple images using different color spaces. Then for each color space, histogram counts are performed for the color channels of the color spaces. As explained further below, combined data from the color channel histogram counts provides a feature vector for the digital image of the tissue sample, which can be related to the grade.

Still other feature extraction operations 828 use co-occurrence matrix values, wherein the co-occurrence matrix is obtained from grey scale values of the digital image of the tissue sample.

At stage 830, in those embodiments in which at least one of optional additional feature extraction operations 824, 826, or 828 are used in conjunction with the Shearlet transform feature extraction operation, the features obtained from all feature extraction operations may be combined using Multiple Kernel Learning (MKL) algorithms.

At stage 840 the information obtained from feature extraction operations is used to obtain a grade determination. The details of each of the feature extraction operations and the methods for combining the results are now explained in further detail.

While a continuation Shearlet transform was previously detailed, a discrete Shearlet transform may be used in various embodiments. For implementation in computing systems, in particular for analyzing a digital image comprising a finite array of pixel values, a discrete form of the Shearlet transform can be used. Discrete Shearlet transform is obtained by sampling the continuous Shearlet transform $SH_\psi f(a,s,t)$ on appropriate discretizations of the scaling, shear, and translation parameters: a, s, t. The continuous translation variable $t \in R^2$ is replaced by a point in the discrete lattice $Z^2$. Choosing $\alpha = 2^{-j}$ and $s = -l$ with $j, l \in Z$ one can acquire the collection of matrices $M_{2^{-j},-l}$ by observing that:

$$M_{2^{-j},-l}^{-1} = M_{2^j,l} = \begin{pmatrix} 2^j & l2^{j/2} \\ 0 & 2^{j/2} \end{pmatrix} = B_0^l A_0^j, \quad (9)$$

$$\text{where } A_0 = \begin{pmatrix} 2 & 0 \\ 0 & \sqrt{2} \end{pmatrix} \text{ and } B_o = \begin{pmatrix} 1 & 1 \\ 0 & 1 \end{pmatrix}$$

The discrete system of Shearlets can be obtained as:

$$\psi_{j,l,k} = |\det A_0|^{j/2} \psi(B_0^l A_0^j x - k) \quad (10)$$

$$\text{where } j, l \in Z, k \in Z^2 \quad (11)$$

The discrete Shearlets share the special ability to deal with multidimensional functions with their continuous counterpart.

Figure 9:
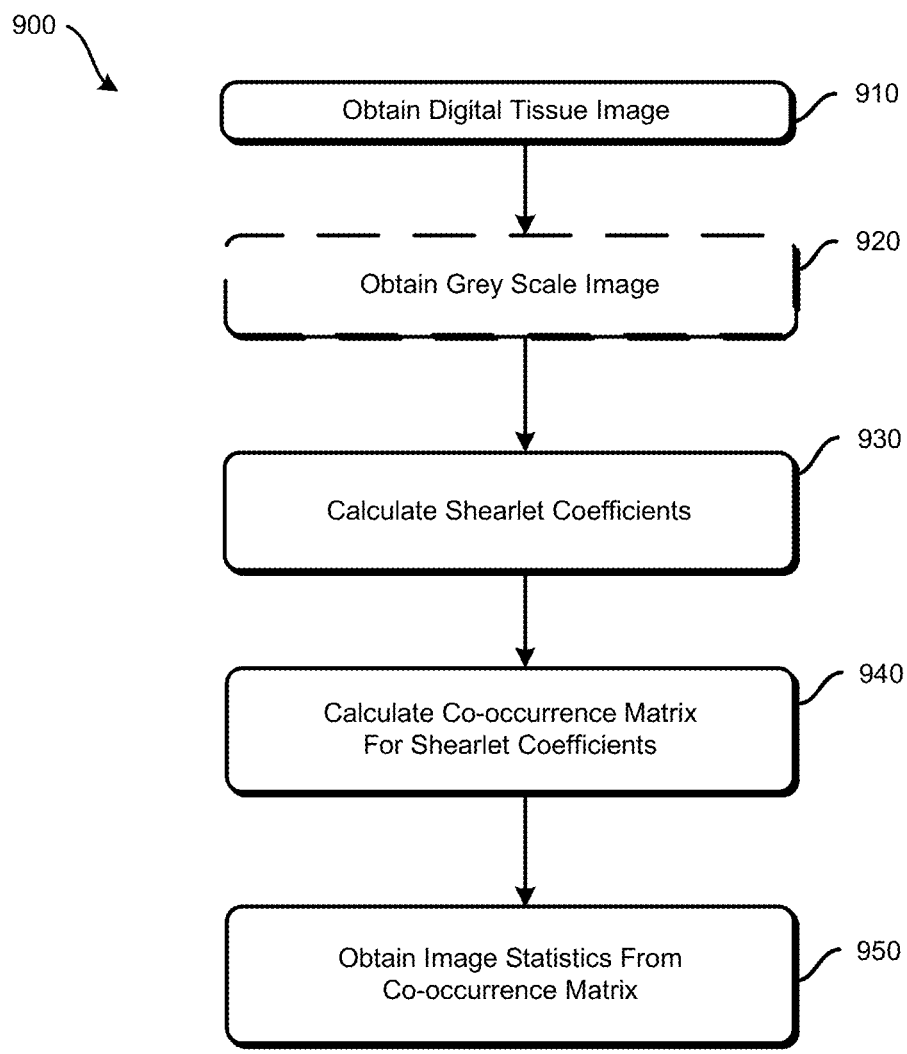
FIG. 9 illustrates an embodiment of a method for applying a discrete Shearlet Transform to a digital image of a stained and imaged tissue sample.

FIG. 9 illustrates an embodiment of a method 900 for applying a discrete Shearlet Transform to a digital image of a stained and imaged tissue sample. Method 900 may be performed using system 100 of FIG. 1. Specifically, the discrete Shearlet transform may be performed using tissue feature extraction hardware 122 of tissue sample processing hardware 120. In block 910, a digital tissue image is obtained such as by biopsy, staining and image capture as detailed in relation to system 100 of FIG. 1. Optionally, preliminary procedures related to de-noising and anti-aliasing may be performed to obtain a digital tissue image to which the discrete Shearlet transform may be applied.

In some embodiments, block 920 is performed in the case that the digital tissue image has the form of a color image comprising multiple color channels. The image is converted to a an equivalent grey scale tissue image.

At block 930, a discrete Shearlet transform is performed with the grey scale tissue image as the input array. This calculation results in an array of discrete Shearlet transform coefficients. In certain embodiments, five levels of decomposition, corresponding to scale (represented by the index j), are used. Shearlet coefficients typically are complex numbers, and so can be expressed, in one way, using amplitude and phase. Either of these components may be used in calculating the co-occurrence matrix or histograms. Preferred embodiments make use of amplitude values of the Shearlet coefficients.

At stage 940, after calculation of discrete Shearlet coefficients of the image, a co-occurrence matrix may be calculated from the array of discrete Shearlet coefficients. The co-occurrence matrix can provide information about the texture of the images since Shearlet coefficients are good representatives of heterogeneity of images. A co-occurrence matrix is defined by:

$$C_{\Delta x, \Delta y}(i, j) = \quad (12)$$

$$\sum_{p=1}^{n} \sum_{q=1}^{m} \begin{cases} 1, & \text{if } I(p, q) = i \text{ and } I(p + \Delta x, q + \Delta y) = j \\ 0, & \text{otherwise} \end{cases}$$

where i and j are the image intensity values of the image, p and q are the spatial positions in the image I, and the offset $(\Delta x, \Delta y)$ depends on the direction $\theta$ used and the distance at which the matrix is computed.

Then various embodiments statistics are calculated from the co-occurrence matrix of the Shearlet coefficients. These statistics may include entropy, autocorrelation, contrast, correlation, cluster prominence, cluster shade, dissimilarity, energy, homogeneity, maximum probability, sum of squared variance, sum average, sum variance, sum entropy, difference variance, difference entropy, information measure of correlation, inverse difference, and inverse difference momentum. Other statistics may also be included. In some embodiments, a principle component analysis (PCA) may be performed on the statistics, to keep only the most significant factors within the set of statistics.

In addition to calculating statistics from the co-occurrence matrix obtained from the discrete Shearlet coefficients, various embodiments may also calculate a Histogram of Shearlet Coefficients (HSC) and compare it with the co-occurrence matrix features.

Various embodiments thus apply the discrete Shearlet Transform of the digital tissue image, followed by a calculation of a co-occurrence matrix of the Shearlet coefficients, to produce a set of statistical data values. In certain embodiments, these statistical data values can be used directly to obtain an estimate for a grade of a tissue sample. Additionally and/or alternatively, these values may then be correlated with other data representative of the digital tissue image to obtain a grade for the tissue sample.

An additional feature extraction operation is based on the morphological changes of the tissue due to malignancy. This may play a role in particular for grading cancer, such as according to the Gleason grading scale. Most of the criteria of malignancy are seen in the nuclei of the cells. The nuclei of malignant cells are larger than those of benign cells, and vary in size and shape. This motivates basing algorithms for morphological feature extraction processes on cell nuclei detection. To achieve this, various embodiments use a Mean Shift clustering algorithm for the task of color approximation and then apply thresholding in the Hue/Saturation/Value (HSV) color space to distinguish cell nuclei from other parts of the tissue. The mean shift algorithm uses a window around each data point and computes the mean of data inside the window. Then it shifts the center of the window to the mean and repeats the algorithm until convergence. Based on this algorithm the window moves to a crowded region of the dataset find the more important parts of the data.

Additional steps may be used to achieve improved results, such as in the case of H&E stained images of prostate tissue. In some embodiments, after initial segmentation using mean shift algorithm which reduced the number of distinct colors, the segmented image is converted to HSV color space. A threshold is then applied in the HSV color space to separate cell nuclei from other parts of the tissue. Human perception of color can be best exploited by the HSV color space. This can be advantageous in the case of H&E images of prostate tissue. To apply the threshold to separate blue hue (cell nuclei) from pink hue (other parts of tissue), an embodiment uses a fixed empirical threshold and applies it based on the following algorithm for calculating a mask that provides a segmentation of the image:

$$M(i, j) = \begin{cases} 1, & \text{if } 0.70 \le \text{hue}(i, j) \le 0.88 \\ 0, & \text{otherwise} \end{cases} \quad (13)$$

Other cutoffs may be applied for other staining methods and types of tissue samples.

The mask so calculated results in a binary mask from the original digital tissue image that segments the cell nuclei. After the cell nuclei have been so segmented, the cell nuclei area is calculated by counting the number of white pixels in the resulting mask and using that as a feature for classification.

Figure 10:
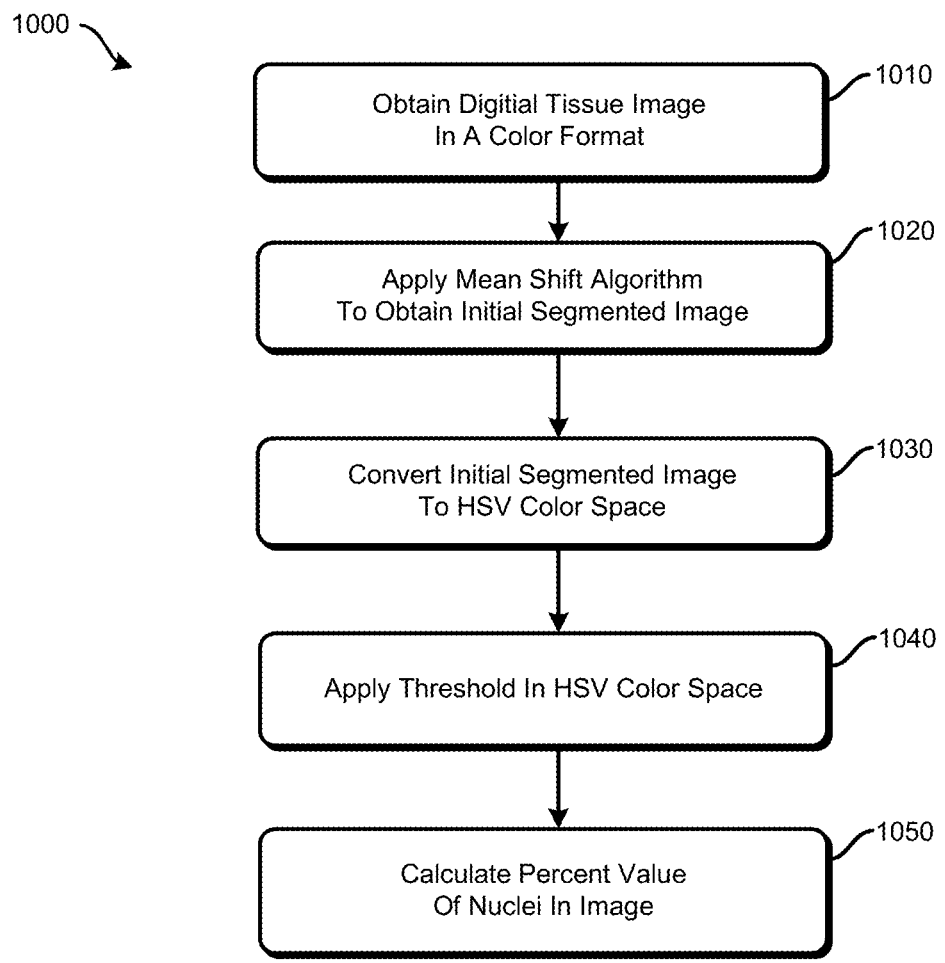
FIG. 10 illustrates an embodiment of a method for morphological feature extraction.

FIG. 10 illustrates an embodiment of a method 1000 for morphological feature extraction. Method 1000 may be performed using system 100 of FIG. 1. Specifically, the morphological feature extraction may be performed using tissue feature extraction hardware 122 of tissue sample processing hardware 120. The feature extraction operation of method 1000 can be combined with results of other feature extraction operations to produce a combined value for the grade of the tissue.

At block 1010, a digital tissue image is received as an input. For this feature extraction operation the digital tissue image is a color image, such as a captured image of an H&E stained prostate tissue sample. At block 1020, a mean shift algorithm is applied to the digital tissue image. An initial segmented image is produced. This may produce an initial segmented image having a reduced number of distinct colors.

At block 1030, the initial segmented image may be converted to the HSV color space. This produces a secondary segmented image.

At block 1040, a threshold is applied to a color channel of the secondary segmented image. In a preferred embodiment the thresholding is applied to the hue (H) channel, and uses the cutoff algorithm given above in equation (13) to produce a mask that provides a further segmentation of the image.

At block 1050, an estimate for the grade of the tissue is determined using the mask by calculating a percentage value of nuclei in the image. In some embodiments the cell nuclei area may calculated by the number of white pixels in the mask. The grade of the tissue can be correlated with the percent of cell nuclei area in the segmented image.

A further feature extraction operations that may be used is based on color values present in the digital tissue image. For prostate cancer, as the Gleason grade increases, blue stained epithelial cell nuclei invade pink stained stroma and white colored lumen regions. Therefore, it is possible to use color channel histograms to represent the change in color due to the changes in epithelial cell nuclei area.

Figure 11A:
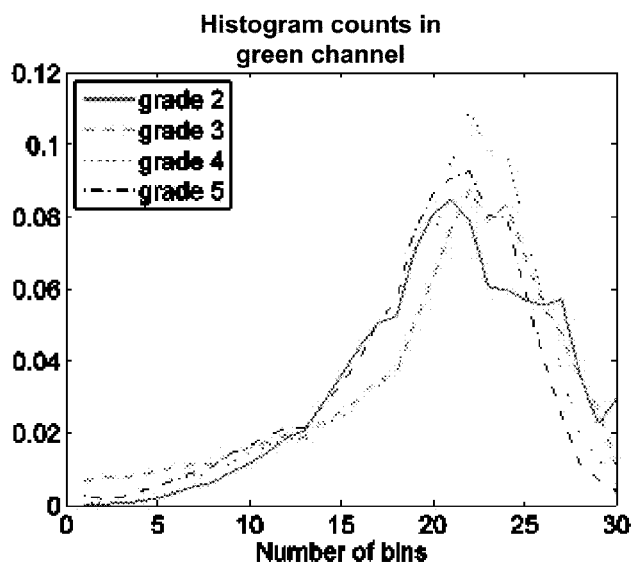
FIGS. 11A, 11B, and 11C, which are color drawings, show differences in color channel histograms of different Gleason grade images of prostate tissue samples.
Figure 11B:
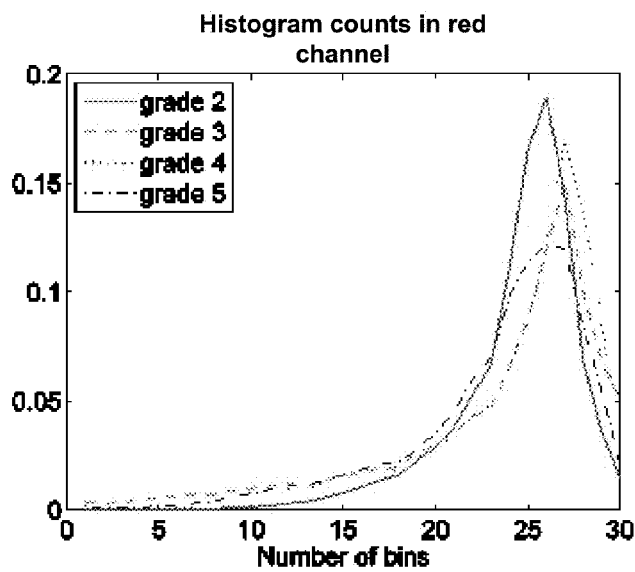
Figure 11C:
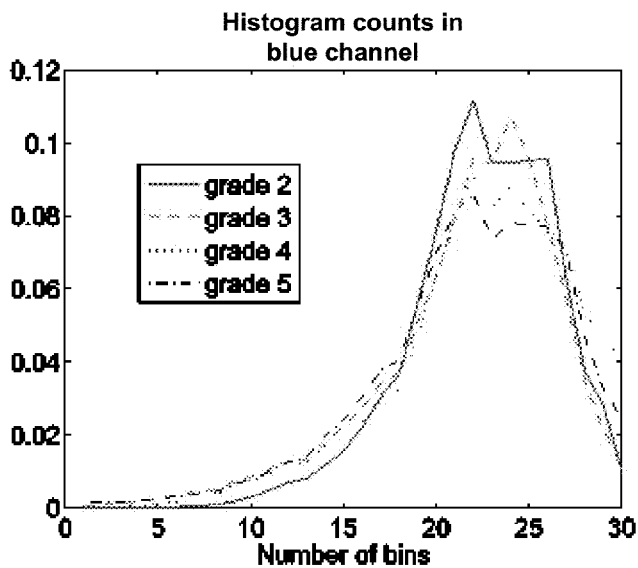

FIGS. 11A, 11B, and 11C show differences in color channel histograms of different Gleason grade images. The red, green and blue color channel histograms of Gleason grades 2 to 5 are represented in FIGS. 11A-11C. It can be observed from the histogram of the green channel that as the Gleason grade increases, the histogram moves towards lower green channel intensity values (lower number of counts in the green channel). The values on the graphs are the average values of histogram counts for a whole dataset, since there may be large within-class variations for histograms.

Some embodiments calculate histograms of YCbCr, HSV, CIELAB, and CIELUV color spaces as well. Other color spaces, or other sets of color spaces may also be used. As an example, by converting from RGB to YCbCr color space the main colors related to red, green and blue are processed into less redundant and more meaningful information. Human perception of color correlates with the HSV (hue, saturation, value) color space, which makes it more favorable in the particular case of images of H&E stained prostate tissue. The CIELAB (L for lightness, and a and b for the color component dimensions) color space is designed to approximate human vision and matches human perception of lightness. The CIELUV is also another color space that fits human perception of colors better than original RGB color space.

Figure 12:
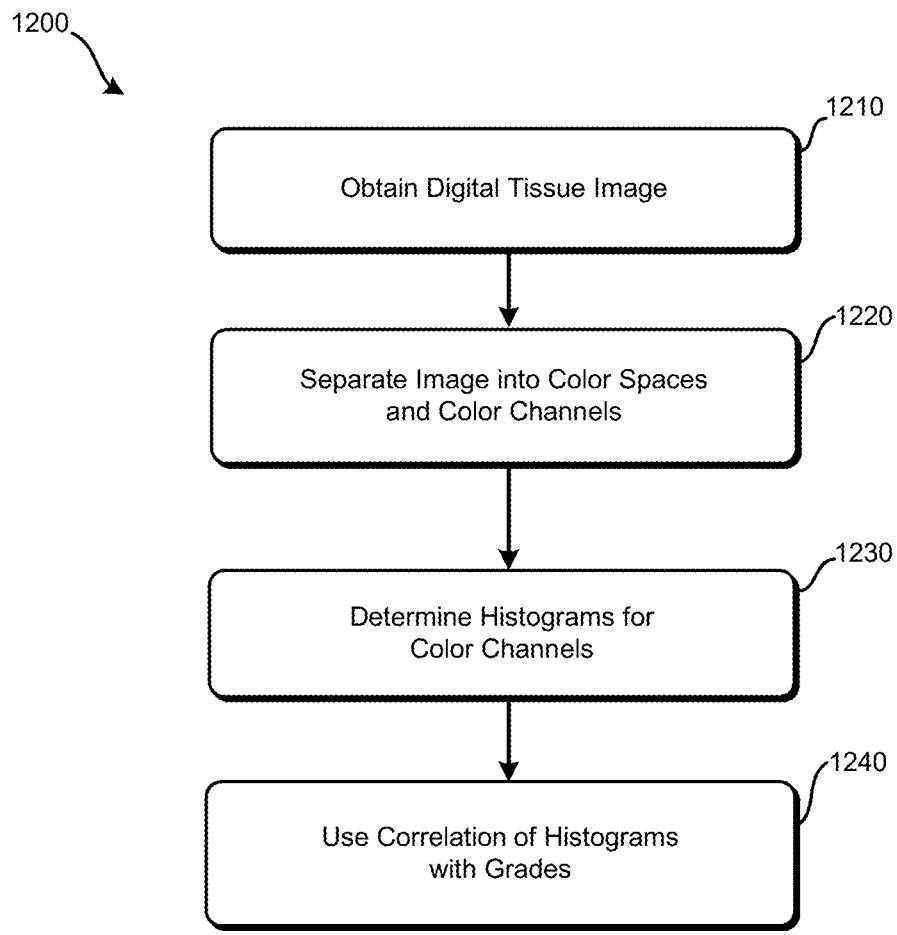
FIG. 12 is an embodiment of a method for a feature extraction operation based on color channel histogram counts.

In some embodiments, five color spaces were used, each having three components or color channels. For each image, the histogram of each component of each color space is found using 30 bins. Then each histogram was normalized by dividing it by the number of pixels in the image so that it is independent of image size. Therefore, for each image, fifteen color channel histograms were extracted, each of size 30×1. After combining them produced a feature vector of size 450×1. In other embodiments, greater or fewer numbers of color channel histograms may be extracted FIG. 12 is an embodiment of a method 1200 for a feature extraction operation based on color channel histogram counts. Method 1200 may be performed using system 100 of FIG. 1. Specifically, the feature extraction may be performed using tissue feature extraction hardware 122 of tissue sample processing hardware 120. At block 1210, digital tissue images may be obtained. In various embodiments, the format for the digital tissue image is in Red/Green/Blue (RGB) color format. However, the input digital tissue image could be received in another color format in other embodiments.

At block 1220, from the input digital tissue image, multiple additional images in alternative color formats may be generated. Examples of such alternative color formats include HSV (for Hue/Saturation/Value), YCbCr (for luma, blue difference chroma, red difference chroma), CIELUV, and CIELAB. In one exemplary embodiment, five images (including an original RGB) for each of these color spaces are generated for use. Each of these five color spaces has three respective color channels. The data for each color channel for each color space may be separated.

At block 1230, histograms for a plurality of the color channels are calculated. The bins can measure the number of pixels at various levels of intensity. As an example, in standard 24-bit RGB color format, 8 bits per channel are allocated per pixel to denote the intensity, so that the intensity value can vary from 0 to 255. The number of bins used for histograms may be based on how well the such histograms correlate with grades of tissue samples. In one embodiment it was found to be advantageous to allocate the intensity levels into 30 bins. Other number of bins may be used. The number of bins, and their respective endpoints, may be input parameters to automated processes that use color histogram counts as part of determining a grade of a tissue sample.

By experiment with training tissue samples for a given cancer type, e.g., prostate cancer, having known grades, it may be possible to select a combination of specific color spaces and channels for use in method 1200 for estimating the grade of a new tissue sample. As shown in FIG. 11A-C, it can be observed that as the Gleason grade increases, the green channel histogram moves towards lower green channel intensity values. In the exemplary embodiment just discussed, all 15 color channels are used.

At block 1240, a correlation of the histograms with a grade for the tissue sample in the digital tissue image is obtained. The correlation may be obtained from use of training images with known grades. The correlation may be used a part of a process that uses the histogram data in conjunction with the data from other methods, such as the methods based on discrete Shearlet transforms, as previously detailed. In the exemplary embodiment just discussed, the histogram data comprises a vector of length 30×5×3=450. This vector may be used as an input into a tissue grading system based on Multiple Kernel Learning.

Figure 13:
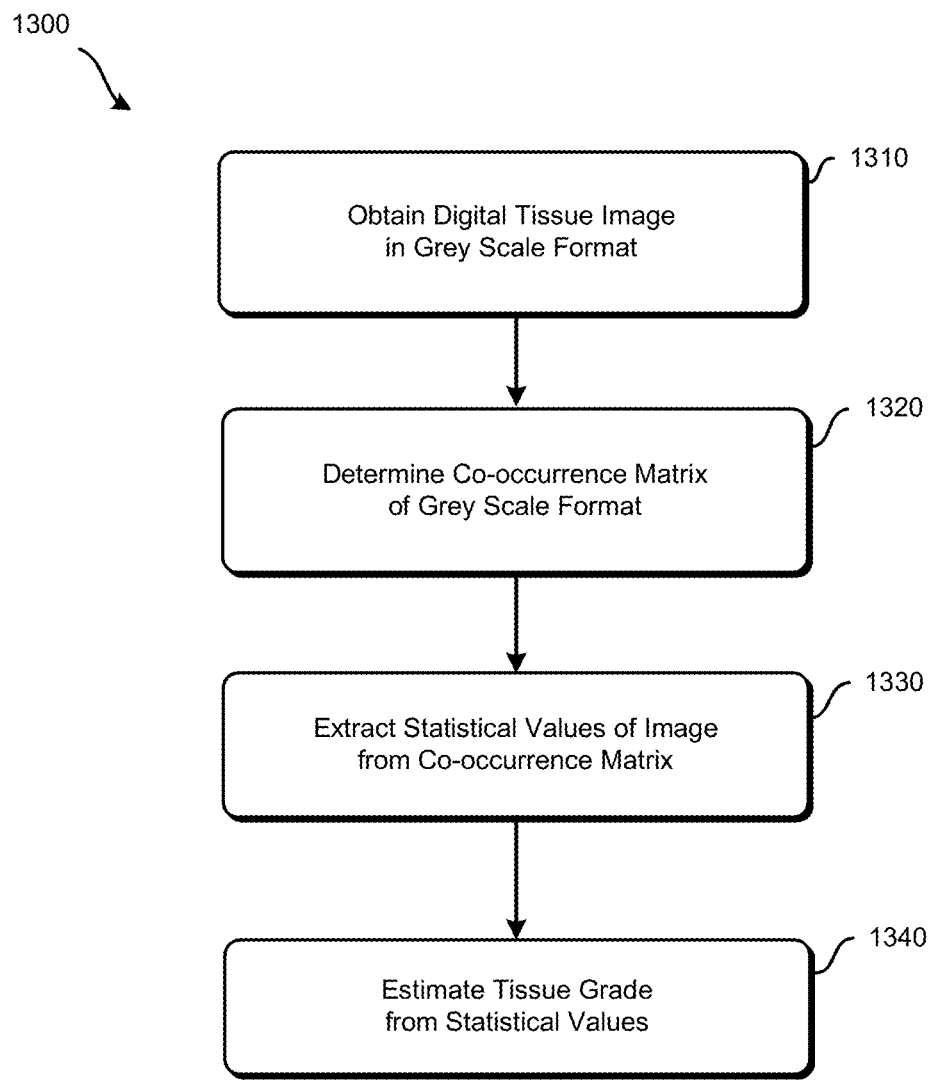
FIG. 13 illustrates an embodiment of a method for a feature extraction operation based on a co-occurrence matrix directly calculated from a grey scale version of a digital tissue image

Co-occurrence matrices were discussed above in relation to the extracting features from discrete Shearlet coefficient data. Techniques of determining statistical data from a co-occurrence matrix may also be applied to a grey scale version of the digital tissue image. FIG. 13 illustrates an embodiment of a method 1300 feature extraction operation based on a co-occurrence matrix directly calculated from a grey scale version of a digital tissue image. Method 1300 may be performed using system 100 of FIG. 1. Specifically, the feature extraction may be performed using tissue feature extraction hardware 122 of tissue sample processing hardware 120.

At block 1310, a digital stained tissue image may be obtained. If the form of the digital tissue image is not initially in grayscale, it may be converted to grayscale. At stage 1320, a co-occurrence matrix from the grey scale image is calculated. The co-occurrence matrix represents the probability distribution of occurrence of two pixels separated by a given offset. In exemplary embodiments, 8 grey levels are used for the grey scale image (corresponding to 3 bits per pixel). The offsets are given by a 2-dimensional vector specifying a row (vertical) and column (horizontal) shift. In some embodiments four offsets {[1,0], [0,1], [1,1], [−1,1]}, are used, corresponding to offsets at angles −90°, 0°, −45°, and 45°, each producing a co-occurrence matrix of size 8×8. Using all four offsets produces a data array of size 8×8×4 for an image. If more gray levels and/or offsets are used, the resulting size of the co-occurrence matrix data array changes accordingly.

At block 1330, statistical data is extracted from the co-occurrence matrix data array. These may include: entropy, autocorrelation, contrast, correlation, cluster prominence, cluster shade, dissimilarity, energy, homogeneity, maximum probability, sum of squared variance, sum average, sum variance, sum entropy, difference variance, difference entropy, information measure of correlation, inverse difference, and inverse difference momentum. Other statistics may also be used. A Principle Component Analysis (PCA) may be used to combine and reduce the total number of statistics used in the subsequent stages.

At block 1340, the statistical data is used, in some embodiments, as basis for determining an estimate for a grade of the tissue in the digital tissue image. In additional and/or alternative embodiments the statistical data is used in conjunction with the data from other methods, such as the methods based on discrete Shearlet transforms, as discussed above. The statistical data may be used as an input into for a tissue grading system based on Multiple Kernel Learning.

Described above were four exemplary types of feature extraction operations that may be performed on an input digital tissue image: statistics from a co-occurrence matrix calculated from discrete Shearlet coefficients, color channel histograms, co-occurrence matrix features, and morphological features obtained by a mean shift algorithm followed by conversion to HSV color space and thresholding. Other feature extraction operations may also be used in various combinations with these four or some subcombination of these four. The results of these feature extraction operations may be combined in a manner that finds the best way to represent and classify these features.

Various embodiments use a feature fusion/classification technique using a method or system that has been trained by use of digital tissue images of tissues having a known grade. Once such preliminary supervised machine learning has been performed for the method or system, the method or system can then determine grades from digital images of tissue samples for which the grade is not known beforehand. Such methods or systems can be automated.

One type of machine learning used with training data sets is Support Vector Machines (SVM). The simplest form of SVM is based on finding a linear hyperplane separating a set of input vectors, using binary decision making. Once trained (e.g., the hyperplane is determined), the result can be applied to classify arbitrary input vectors. Nonlinear SVM extends linear SVM by use of various nonlinear functions $K(x_1, x_2)$ (known as kernels) in place of vector dot product calculations $x_1 \cdot x_2$. Multiclass SVM extends binary decision SVM to the case of multiple output levels. This is the situation relevant to determining a grade of a tissue sample, such as determining in which of the five Gleason grades a prostate tissue sample lies. Multiclass SVM uses binary SVM in either: (a) one-against-all, or (b) one-against-one. Preferred embodiments may make use of tissue grade classification methods or systems trained using one-against-all multiclass SVM.

In addition to using multiclass SVM to provide the training for the tissue grade classification methods or systems, the number and type of kernels to be used in SVM is to be specified. With multiple kernels, called Multiple Kernel Learning (MKL), either the input consists of a k-many of vectors initially, or a single input vector is segmented into k-many of vectors. Respective kernels are used for each of the k-many vector spaces. The parameters and the type of the multiple kernels are optimized based on training data. MKL can be advantageous for fusing heterogeneous features. There are at least two advantages for using MKL for feature fusion: 1) MKL is designed for simultaneous feature fusion and classification, thus eliminates the need to design a feature selection step for optimal classification results; 2) it matches with the problem at hand since the feature extraction operations produce different representations of data. Since these are different representations, they have different measures of similarity corresponding to different kernels. Therefore combining kernels is a reliable way to combine multiple sources of heterogeneous information. Various embodiments use a variant called SimpleMKL which is an example of a Multiple Kernel Learning (MKL) algorithm.

Various embodiments use multiclass SVM with MKL as part of a process for estimating the grade of a tissue sample from a digital image of the tissue. In these embodiments, the data vectors from the plurality of feature extraction operations form the multiple input vectors to which a trained SVM/MKL method or system is applied.

An experiment using an embodiment of the methods and systems described above in FIGS. 8-12 yielded unexpected, excellent Gleason grade determination for digital images of prostate tissue samples. The total dataset comprised 100 H&E stained images, which had Gleason grades in the range 2-5 independently determined and confirmed by pathologists. When the features were extracted, they were normalized by dividing by image size. For Shearlet coefficient features and also co-occurrence matrix features the images were converted to black and white to simplify the calculations, since the color of the image did not have any information in these two sets of features. However for color channel histogram features and also morphological features the original color images were used since these features require color information for further processing.

For sampling images for training and testing of our classification algorithms throughout all experiments we use the leave one out (LOO) technique. A total of 40 images were used as an evaluation set for tuning SVM hyperparameter C. After the best C was found, the remaining 60 images were used for training and test using LOO. For training 59 images are used, and one image is used for test. This is run 60 times so that every image has been tested. For each image, after extracting features the process chooses the first few eigenvectors that capture at least 90% of the total variance using Principle Component Analysis (PCA)

method. The process uses a one-against-all multiclass classification method. For each type of feature, Gaussian and polynomial kernel functions with different parameters are linearly combined to classify the different Gleason grade images using a multiclass-SVM classifier as following:

$$K_{POL}(x_i, x_j) = (x_i \cdot x_j + 1)^q, q \in N$$

$$K_{GAU}(x_i, x_j) = e^{-\|x_i - x_j\|_2^2 / 2S^2}, S \in R_{++}, \quad (14)$$

where q is the degree of polynomial function and S is the sigma value of Gaussian function. In the experiments, different values of parameters for the two kernel functions were set with the criterion that they fill a proper range of the defined domain. For the Gaussian function, we set S belonging to [0.5, 1, 2, 5, 7, 10, 15, 20, 100, 1000]; and for the polynomial functions, we set $q \in [1, 2, 3]$. Thus, there were 13 alternatives for parameterizing the two defined kernel functions. Therefore, given the $i^{th}$ and $j^{th}$ samples, the fusion of extracted color features ($\{x_i, x_j\}$), co-occurrence matrix features ($\{y_i, y_j\}$), morphological features ($\{z_i, z_j\}$) and Shearlet features ($\{w_i, w_j\}$) at the kernel level within this framework is handled as follows:

$$K_{i,j} = \sum_{m=1}^{13} [d_m k_m(x_i, x_j) + d_{m+13} k_{m+13}(y_i, y_j) + d_{m+26} k_{m+26}(z_i, z_j) + d_{m+39} k_{m+39}(w_i, w_j)]. \quad (15)$$

In (15) the $k_{m+\alpha}(.,.)$, for $\alpha=0, 13, 26$ or $39$, is one of the optional kernel functions as described above, and $d=(d_1, d_2, \ldots, d_{52})^T$ (for $\|d\|_p = 1$, where $p \geq 1$) is the kernel combination vector to be optimized using the MKL algorithm.

Also included are known baseline methods "average" and "product" kernels, which were found using the following formulas:

$$K_{i,j}^{Average} = \frac{1}{13} \sum_{m=1}^{13} k_m(x_i, x_j) \quad (16)$$

$$K_{i,j}^{Product} = \left( \prod_{m=1}^{13} k_m(x_i, x_j) \right)^{\frac{1}{13}} \quad (17)$$

This framework was used in the experiments to evaluate embodiments of an automated Gleason grading system, and compare it to grading results that would be obtained using each feature extraction operation separately.

For color channel histograms, the procedure explained in relation to FIG. 10 was followed. Overall five color spaces were used, each with three components, resulting in 15 color channels in total. For each image, the histogram of each component of each color space using 30 bins was found which returned the best evaluation results according to preliminary tests. Then each histogram was normalized by dividing it by the number of pixels in the image so that it was independent of image size. Therefore for each image there were extracted 15 color channel histograms, each of size 30×1. The combined feature set was of size 450×1.

The classification results using single kernel SVM for just color histograms are presented in Table 2. Good classification accuracy using green channel histogram, as predicted and explained previously. HSV color channels are also returned good classification accuracies. By including more color channel histograms from other image spaces besides RGB, we were able to extract effective features from our images.

TABLE 2

Classification results for color channel histograms using polynomial SVM kernel

| Color channel | Accuracy |
|---|---|
| Red | 78% |
| Green | 90% |
| Blue | 76% |
| Y | 76% |
| Cb | 82% |
| Cr | 78% |
| Hue | 86% |
| Saturation | 82% |
| Value | 80% |
| L | 78% |
| A | 80% |
| B | 76% |
| L' | 34% |
| U | 70% |
| V | 70% |
| Combined | 93% |

The co-occurrence feature extraction operation described above was used for this experimental framework. In these experiments it was realized that changing the distance between the pixel of interest and its neighbors does not affect our classification results. However, changing the number of directions from 4 to 8 increased the classification accuracy as seen in Table 2. A classification accuracy of 90% for Gleason grading was achieved using the statistics extracted from co-occurrence matrix of gray levels.

TABLE 3

Classification results for co-occurrence matrix features using polynomial SVM kernel

| Number of directions | Accuracy |
|---|---|
| 4 | 88% |
| 8 | 90% |

To use Shearlet coefficient features, the images were made square in size to be able to apply Shearlet transform on them. Then the Shearlet coefficients of the images using 2, 3, 4, and 5 decomposition levels were calculated. Two approaches were tested to extract the features. First, a histogram of Shearlet coefficients (HSC) as described above was found using fixed number of 60 bins for the histograms. However the best classification accuracy that was achieved using HSC was 65%.

Second, statistics from co-occurrence matrix of Shearlet coefficients were extracted and used for classification. It can be seen in Table 4 that higher decomposition levels result in higher classification accuracy. The reason behind this is higher decomposition levels can correspond better to finer features in the image comparing to lower decomposition levels which are good representatives of coarser features. Therefore for higher Gleason grades since the level of malignancy increases, there are finer details in the images, this makes the higher decomposition level of Shearlet transform a more suitable tool for feature extraction. The experiment achieved a high classification accuracy of 91% using Shearlet coefficients, as shown in Table 3.

Tests also compared the classification results of the proposed Shearlet transform based features with Gabor filter and Histogram of Oriented Gradients (HOG). It is obvious that Shearlet transform with co-occurrence matrix feature extraction outperforms both Gabor and HOG in terms of classification accuracy.

TABLE 4

Classification results for Shearlet coefficients using Gaussian SVM kernel

| Method | Accuracy |
|---|---|
| HSC | 65% |
| Shearlet level 2 | 78% |
| Shearlet level 3 | 80% |
| Shearlet level 4 | 88% |
| Shearlet level 5 | 91% |
| Gabor | 51% |
| HOG | 51% |

For morphological feature extraction, the process followed the mean shift algorithm process of FIG. 10. The mean shift algorithm that was used was that provided in the MATLAB toolbox of: Comaniciu D, Meer P. *Mean shift: A robust approach toward feature space analysis. Pattern Analysis and Machine Intelligence*, (IEEE Transactions on 2002; 24, 603-619). Some of the parameters of mean shift algorithm that could affect the feature extraction results were spatial resolution ($h_s$), range resolution ($h_r$), and minimum region area (S). The parameter $h_s$ is a representative of spatial relationship between features; increasing it will keep only features with large spatial support. The parameter $h_r$ represents color contrast, and only features with high color contrast survive when increasing $h_r$. In these experiments [$h_s$, $h_r$, S]=[2, 6.5, 20] returned the best results. After initial segmentation using mean shift algorithm, the segmented image was converted to the HSV color domain and applied a threshold on hue value to separate cell nuclei from other parts of the tissue, as explained above. After finding the mask image containing all the extracted cell nuclei, the area of cell nuclei (white pixels in the mask) was calculated, and the images classified using SVM.

The experiments were able to achieve high classification accuracy of 96% using the extracted cell nuclei as features. This shows the importance of using cell nuclei changes in different Gleason grade images for classification.

In the experiments, after applying PCA and dimension reduction there are 4 feature matrices of size 100×10, 100×11, 100×1, and 100×8 for color channel histograms, co-occurrence matrix features, morphological features, and Shearlet based features, respectively. Table 4 summarizes the classification results using each feature separately. It can be observed that they return good classification accuracies.

Color channel histograms and co-occurrence matrix features return good results. One reason for this might be the fact that histological images convey color information and their colors change as Gleason grade increases. Morphological features are returning classification accuracy of 96%. This is due to the fact that as Gleason grade increases, the morphology of cancer cell nuclei change which in turn lead to good classification accuracy. Shearlet transform returns classification accuracy of 91% which can be regarded robust taking into consideration that Shearlet is a general transformation that is not specifically designed for the task of Gleason grading.

While the separate approaches above each yield very good results, the experiments show surprising excellent results when the separate results are fused using embodiments of the methods and systems disclosed herein. Two approaches for fusion were tested: single kernel and multiple kernel SVM.

For single kernel SVM classification all the features were concatenated and a single kernel SVM was used for classification. The experiments used a polynomial kernel of degree 1 to 3 and Gaussian kernel with S belonging to [0.5, 1, 2, 5, 7, 10, 15, 20, 100, 1000]. The classification results using both kernels are presented in Table 4. The experiments achieved 95% classification accuracy using single kernel SVM. However it is less than using each feature separately which indicates the embodiments' more sophisticated methods to combine these features is preferred.

For multiple kernel SVM classification using SimpleMKL, the procedure explained above was used along with the MATLAB toolbox for SimpleMKL provided in: Rakotomamonjy A, Bach F R, Canu S, Grandvalet Y. *SimpleMKL*, (Journal of Machine Learning Research, 2008). Instead of assigning a specific kernel with its parameters to the whole data, the MKL algorithm chooses the appropriate combination of kernels and parameters from the stack of predefined kernels and parameters. To combine all four types of features the tests used MKL as explained above. The procedure explained in the paper of Rakotomamonjy cited above was used to normalize the data to have zero mean and unit variance. A polynomial kernel of degree 1 to 3 and Gaussian kernel with S belonging to [0.5, 1, 2, 5, 7, 10, 15, 20, 100, 1000] were chosen. For the hyperparameter C, the tests had 100 samples over the interval [0.01, 1000]. For sampling, first the best hyperparameter C was found using 40 images as an evaluation set. Then the rest of the images (60) were used for training and testing using a LOO sampling method. This achieved an unexpected and perfect classification accuracy of 100% after only 30 iterations of the algorithm when the variation and KKT convergence criteria were reached. Also included in Table 4 are baseline methods "average" and "product" kernels as explained above.

TABLE 5

Classification results using all of the features

| Method | SVM kernel | Accuracy |
|---|---|---|
| Color channel histograms | Polynomial | 93% |
| Co-occurrence matrix | Polynomial | 90% |
| Shearlet coefficients | Gaussian | 91% |
| Morphology features | Gaussian | 96% |
| Single kernel SVM | Polynomial | 95% |
| Single kernel SVM | Gaussian | 95% |
| Averaging kernel | Polynomial + Gaussian | 94% |
| Product kernel | Polynomial + Gaussian | 75% |
| MKL | Polynomial + Gaussian | 100% |

Table 5 summarizes the classification accuracy along with the SVM kernel of different features and also combinations of them using single kernel SVM, baseline methods, and MKL. It can be observed that MKL outperforms other classification methods.

Figure 14:
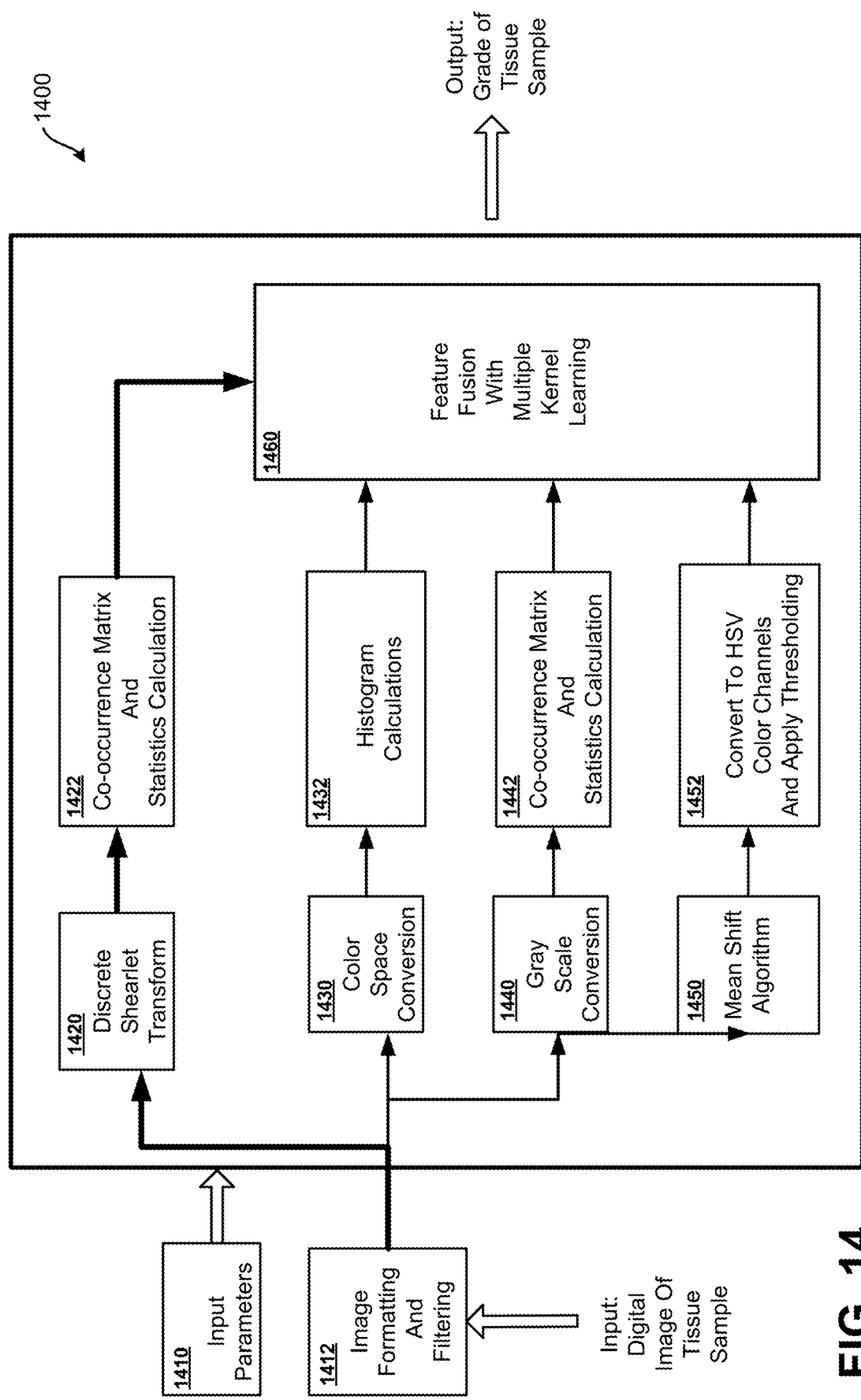
FIG. 14 illustrates a system in block diagram form that can be used for classification of carcinoma cells through image analysis.

FIG. 14 illustrates a system 1400 in block diagram form that can be used for classification of carcinoma cells through image analysis using the embodiments of FIGS. 8-13. System 1400 may be implemented using tissue sample processing hardware 120 of FIG. 1. The components shown may be implemented in hardware, such as by one or more processors, application specific integrated circuits (ASICs), or on reconfigurable circuits such as field programmable gate arrays (FPGAs). The system modules may also be implemented as program modules on a dedicated computing system, or as software program modules on a computer system.

The inputs to the system 1400 may comprise input parameters 1410 for the various system modules. Examples of such parameters include: (a) Shearlet transform parameters, such as scaling and number of levels; (b) histogram parameters, such as number of bins to use; and (c) MKL parameters, such as variances for gaussian kernels and coefficients or powers for polynomial kernels. Other input parameters are possible. The values for the input parameters may be set before operation of the system 1400, or may be adjusted during operation. Once the values for parameters are selected, the system 1400 may operate in an automated mode without user input to analyze a digital tissue image.

An image formatting and filtering component 1412 may accept an image of a tissue sample, and may perform image formatting and/or filtering operations, such as digitizing or de-noising. Image formatting and filtering component 1412 may place the image in a square (x by x pixels) format. Image formatting and filtering component 1412 may be included as part of the system 1400 in some embodiments. The result is a digital tissue image that has appropriate for input to the system 1400. The system 1400 accepts the digital tissue image input data and applies a plurality of feature extraction operations to the data.

The system comprises a Shearlet transform computation component 1420 that calculates a discrete Shearlet transform from the input digital tissue image. As discussed above, in various embodiments the Shearlet transform is applied to a digital grey scale image obtained from an H&E stained tissue sample. This produces at least a set of discrete Shearlet transform coefficients, as explained above.

The system comprises a co-occurrence and statistics calculation component 1422 that calculates a co-occurrence matrix from the discrete Shearlet transform coefficients. The module 1422 may also calculate a plurality of statistics values from the co-occurrence matrix values.

Embodiments of the system 1400 may also apply further feature extraction operations to the input digital tissue image. To implement a first such feature extraction operation, the system includes a feature extraction component 1430 that produces a plurality of tissue image data corresponding to the input digital tissue image having respective color space formats. Each of the color spaces may comprise a plurality of color channels. Color space formats may include any of RGB, HSV, YCbCr, CIELUV, CIELAB, and/or other color space formats as would be known to one of skill in the art.

To continue this first additional feature extraction operation, the system may include a histogram calculation processing module 1432 that determines pixel intensity for each color channel, and determines a histogram for the intensities. The choice of number of, and endpoints of, the histogram bins may have been entered as a user input, as explained above. Data produced by the first optional additional feature extraction operation may thus comprise histogram bin values for each color channel for each color space format.

Another feature extraction operation may also be implemented by the system 1400. To implement this second feature extraction operation, the system may include a feature extraction component 1440 that calculates a grey scale image from the input digital tissue image.

To implement this second feature extraction operation, the system may further include a co-occurrence and statistics calculation component 1442 that calculates a co-occurrence matrix from the grey scale image. Component 1442 then may also calculate a corresponding co-occurrence matrix from the grey scale image. From that co-occurrence matrix statistical data values may then be determined, as explained above.

A third optional additional feature extraction operation may also be implemented by the system 1400. To implement this third feature extraction operation, the system may include a feature extraction component 1450 that applies a mean shift algorithm to the input digital tissue image to produce a preliminary segmentation of the input digital tissue image.

The system may further include a color channel conversion component 1452 that converts the preliminary segmentation to the HSV color space. The color channel conversion component 1452 may then apply a threshold value to one or more of the color channels to produce a binary segmentation of the original digital tissue image. As explained above, the thresholding may be applied to the hue color channel of the HSV color space. The threshold values may be an input to the system 1400. The binary segmented image can be used by the module to produce an estimate for the area in the original digital tissue image that corresponds to nuclei in the tissue.

The system 1400 may include a MKL processing component 1460 which takes as inputs at least the statistical data values determined by module 1422, and/or the further data produced by the optional additional feature extraction operations. While each feature extraction operation can be used by itself to produce a value for the grade of the tissue, it is often advantageous to combine the data produced by the feature extraction operations. The module 1460 may perform such a combination by a feature fusion process based on MKL. The parameters for the kernels may have been determined using a Support Vector Machine learning algorithm, or another learning algorithm. The parameters for the kernels may be included with the input parameters for the system 1400.

A result of the feature fusion process of MKL processing component 1460 is an estimate for the grade of the tissue sample. The result may also include confidence values based on the statistics of the data that were inputs to the MKL processing component 1460. The results can become the output of the system 1400.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for identifying and grading cancer in tissue samples, the method comprising:
   acquiring, by tissue sample processing hardware from a medical tissue scanner, a digital RGB (red, green, blue) image of a stained tissue sample, the stained tissue sample to be analyzed on a multiple level scale for cancer, wherein the stained tissue sample is of a type of tissue;
   normalizing the digital RGB image of the stained tissue sample to correct for medical tissue scanning and staining variations;
   performing a Shearlet transform on the normalized digital RGB image of the stained tissue sample;
   perform a feature extraction operation by calculating Shearlet coefficients based on the performed Shearlet transform of the normalized digital RGB image of the stained tissue sample;
   performing an additional feature extraction operation on the normalized digital RGB image of the stained tissue sample;
   combining the results of the feature extraction operation and the additional feature extraction operation using a Multiple Kernel Learning (MKL) algorithm;
   obtaining a grade determination from an output of the MKL algorithm to identify whether cancer is present in the stained tissue sample; and
   outputting a notification indicative of whether cancer is present in the stained tissue sample based on applying the grade determination.

2. The method for identifying and grading cancer in tissue samples of claim 1, wherein obtaining a grade determination to the output of the MKL algorithm comprises selecting a cancer grade from a multiple grade scale and the notification output is further indicative of the cancer grade.

3. The method for identifying and grading cancer in tissue samples of claim 1, wherein the Shearlet coefficients are calculated for magnitude and phase.

4. The method for identifying and grading cancer in tissue samples of claim 3, wherein the Shearlet coefficients for magnitude and phase are each calculated for multiple decomposition levels.

5. The method for identifying and grading cancer in tissue samples of claim 4, wherein the Shearlet coefficients for magnitude and phase are each calculated for five decomposition levels.

6. The method for identifying and grading cancer in tissue samples of claim 2, wherein the multiple grade scale is the Gleason grading scale.

7. The method for identifying and grading cancer in tissue samples of claim 1, wherein the type of tissue is prostate tissue or breast tissue.

8. The method for identifying and grading cancer in tissue samples of claim 1, further comprising scanning the stained tissue sample using the medical tissue scanner to obtain the digital RGB image of the stained tissue sample.

9. The method for identifying and grading cancer in tissue samples of claim 1, further comprising:
   acquiring, by tissue sample processing hardware, the plurality of digital RGB images of stained tissue samples of the type of tissue;
   receiving learning classifications for the plurality of digital RGB images of the stained tissue samples of the type of tissue;
   normalizing the plurality of digital RGB images of stained tissue samples to correct for medical tissue scanning and staining variations;
   performing Shearlet transforms on the plurality of normalized digital RGB images of the stained tissue samples; and
   calculating Shearlet coefficients for each of the performed Shearlet transforms of the plurality of normalized digital RGB image of the stained tissue samples.

10. A system for identifying and grading cancer in tissue samples, the system comprising:
    one or more processors; and
    a memory communicatively coupled with and readable by the one or more processors and having stored therein processor-readable instructions which, when executed by the one or more processors, cause the one or more processors to:
    acquire, from a medical tissue scanner, a normalized digital RGB (red, green, blue) image of a stained tissue sample, the stained tissue sample to be analyzed on a multiple level scale for cancer, wherein the stained tissue sample is of a type of tissue;
    perform a Shearlet transform on the normalized digital RGB image of the stained tissue sample;
    calculate Shearlet coefficients based on the performed Shearlet transform of the normalized digital RGB image of the stained tissue sample to perform a feature extraction operation on the normalized digital RGB image of the stained tissue sample;
    perform an additional feature extraction operation on the normalized digital RGB image of the stained tissue sample;
    combine the results of the feature extraction operation and the additional feature extraction operation using a Multiple Kernel Learning (MKL) algorithm;

obtain a grade determination from an output of the MKL algorithm to identify whether cancer is present in the stained tissue sample; and output a notification indicative of a cancer grade of the stained tissue sample based on applying the grade determination.

11. The system for identifying and grading cancer in tissue samples of claim 10, wherein the Shearlet coefficients are calculated for magnitude and phase.

12. The system for identifying and grading cancer in tissue samples of claim 11, wherein the Shearlet coefficients for magnitude and phase are each calculated for multiple decomposition levels.

13. The system for identifying and grading cancer in tissue samples of claim 12, wherein the Shearlet coefficients for magnitude and phase are each calculated for five decomposition levels.

14. The system for identifying and grading cancer in tissue samples of claim 10, wherein the cancer grade is on the Gleason grading scale.

15. The system for identifying and grading cancer in tissue samples of claim 10, further comprising:

hematoxylin and eosin staining apparatus that applies hematoxylin and eosin stain to a tissue sample to create the stained tissue sample; and the medical tissue scanner to create the digital RGB image of the stained tissue sample.

16. The system for identifying and grading cancer in tissue samples of claim 10, wherein the type of tissue is prostate tissue or breast tissue.

17. The system for identifying and grading cancer in tissue samples of claim 10, wherein the processor-readable instructions, when executed, further cause the one or more processors to:

acquire a plurality of normalized digital RGB images of stained tissue samples of the type of tissue;

receive learning classifications for the plurality of normalized digital RGB images of the stained tissue samples of the type of tissue;

perform Shearlet transforms on the plurality of normalized digital RGB images of the stained tissue samples; and calculate Shearlet coefficients for each of the performed Shearlet transforms of the plurality of normalized digital RGB images of the stained tissue samples.

18. A non-transitory processor-readable medium having stored thereon processor-readable instructions that cause one or more processors to:

access a normalized digital RGB (red, green, blue) image of a stained tissue sample, the stained tissue sample to be analyzed on a multiple level scale for cancer, wherein the stained tissue sample is of a type of tissue;

perform a Shearlet transform on the normalized digital RGB image of the stained tissue sample;

perform a feature extraction operation by calculating Shearlet coefficients based on the performed Shearlet transform of the normalized digital RGB image of the stained tissue sample;

perform an additional feature extraction operation on the normalized digital RGB image of the stained tissue sample;

combining the results of the feature extraction operation and the additional feature extraction operation using a Multiple Kernel Learning (MKL) algorithm obtaining a grade determination from an output of the MKL algorithm to identify whether cancer is present in the stained tissue sample; and output a notification indicative of a cancer grade of the stained tissue sample based on the grade determination.

19. The non-transitory processor-readable medium of claim 18, wherein the Shearlet coefficients are calculated for magnitude and phase.

20. The non-transitory processor-readable medium of claim 18, wherein the processor-readable instructions configured to cause the one or more processors to apply the classifier to the output of the MKL algorithm comprise processor-readable instructions that cause the one or more processors to apply a softmax classifier to select the cancer grade from a multiple grade scale.

* * * * *